(12) United States Patent
Kittlaus et al.

(10) Patent No.: US 11,378,741 B2
(45) Date of Patent: Jul. 5, 2022

(54) OPTO-ACOUSTIC SIGNAL PROCESSING

(71) Applicant: Yale University, New Haven, CT (US)

(72) Inventors: Eric Kittlaus, Pasadena, CA (US); Nils Otterstrom, New Haven, CT (US); Prashanta Kharel, Cambridge, MA (US); Shai Gertler, New Haven, CT (US); Peter Rakich, New Haven, CT (US)

(73) Assignee: YALE UNIVERSITY, New Haven, CT (US)

( * ) Notice: Subject to any disclaimer, the term of this patent is extended or adjusted under 35 U.S.C. 154(b) by 151 days.

(21) Appl. No.: 16/537,229

(22) Filed: Aug. 9, 2019

(65) Prior Publication Data
US 2020/0050030 A1   Feb. 13, 2020

Related U.S. Application Data

(60) Provisional application No. 62/717,299, filed on Aug. 10, 2018.

(51) Int. Cl.
*G02B 6/10* (2006.01)
*G02B 6/12* (2006.01)
(Continued)

(52) U.S. Cl.
CPC .......... *G02B 6/1225* (2013.01); *G02B 6/105* (2013.01); *G02F 1/125* (2013.01); *G02B 6/12004* (2013.01); *G02B 6/12007* (2013.01)

(58) Field of Classification Search
CPC ............... G02B 6/105; G02B 6/12004; G02B 6/12007; G02B 6/1225; G02F 1/125
See application file for complete search history.

(56) References Cited

U.S. PATENT DOCUMENTS 7,869,470 B2 *   1/2011   Wong ................. H01S 3/30
                                                         372/3
8,600,200 B1 * 12/2013   Rakich ............. G02F 1/0126
                                                         385/7
(Continued)

OTHER PUBLICATIONS

Chiles, J. et al., Mid-infrared supercontinuum generation in high-contrast, fusion-bonded silicon membrane waveguides, In the Proceedings of IEEE, 2017, 313-314.
(Continued)

*Primary Examiner* — Ryan A Lepisto
(74) *Attorney, Agent, or Firm* — Brian R. Landry; Kathryn Doyle; Saul Ewing Arnstein & Lehr LLP

(57) ABSTRACT

Devices and systems for opto-acoustic signal processing are described herein. In one embodiment, the device may include a structure configured to laterally confine travelling acoustic phonons (hypersound) throughout, a first multimode optical waveguide embedded within the structure, and an acoustic phonon emitter within the structure, where the first multimode optical waveguide is selected to couple to the acoustic phonons (hypersound) confined within the structure. In one embodiment, the system may include a first light source optically coupled to a proximal end of the first multimode optical waveguide, the first light source emitting a probe wave having a frequency $\omega_p^{(1)}$, and a driver configured to drive the acoustic phonon emitter to emit acoustic phonons (hypersound).

19 Claims, 27 Drawing Sheets
(13 of 27 Drawing Sheet(s) Filed in Color)

(51) Int. Cl.
    *G02B 6/122*   (2006.01)
    *G02F 1/125*   (2006.01)

(56) References Cited

U.S. PATENT DOCUMENTS

| | | | |
|---|---|---|---|
| 9,268,092 B1 * | 2/2016 | Jarecki, Jr. | ............... G02F 1/11 |
| 9,696,492 B1 * | 7/2017 | Cox | ...................... G02F 2/004 |
| 2018/0331490 A1 | 11/2018 | Rakich et al. | |

OTHER PUBLICATIONS

De Leonardis, F. et al., Design Rules for a Nano-Opto-Mechanical Actuator Based on Suspended Slot Waveguides, Photonics, 4, 43, 2017, 8 pages.
Penades, J. S. et al., Suspended silicon mid-infrared waveguide devices with subwavelength grating metamaterial cladding, Optics Express, vol. 24, No. 20, Oct. 3, 2016, 9 pages.
Van Laer, R. et al., Net on-chip Brillouin gain based on suspended silicon nanowires, New Journal of Physics, 17, 2015, 11 pages.
Yu, Z. et al., Complete optical isolation created by indirect interband photonic transitions, Nature Photonics, vol. 3, Feb. 2009, 91-95.
Rakich, P. T., et al., "Stimulated Mach-wave Phonon Emission: Toward broadband phonon emitters and lasers", DARPA Mesodynamic Architectures, Program Review, May 28, 2014, 83 pages.

\* cited by examiner

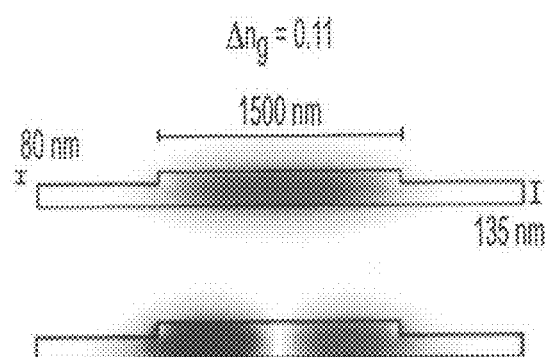
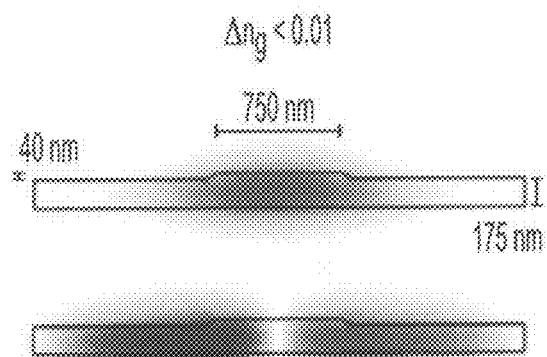
FIG. 6a
FIG. 6c
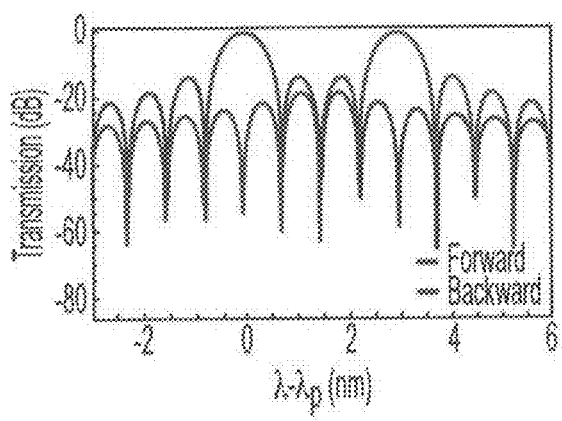
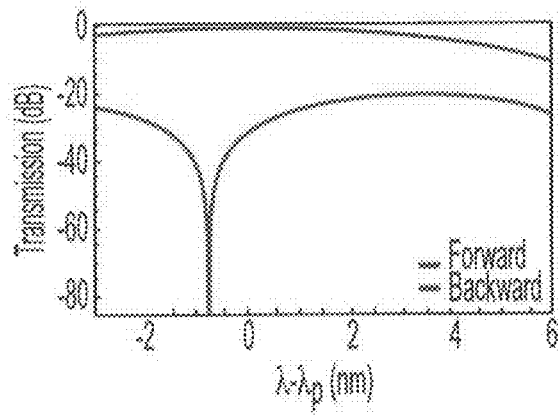
FIG. 6b
FIG. 6d

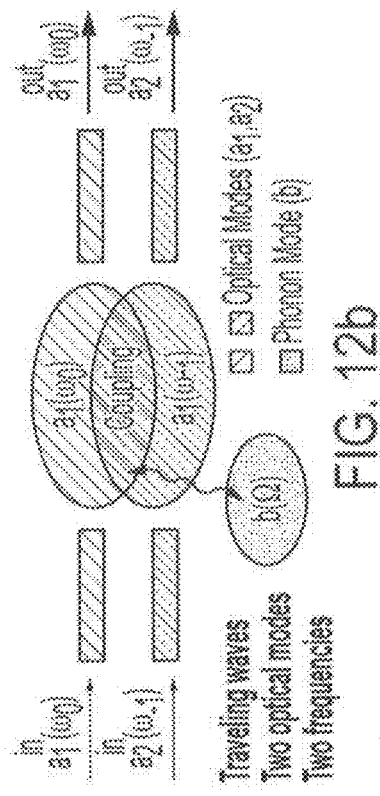
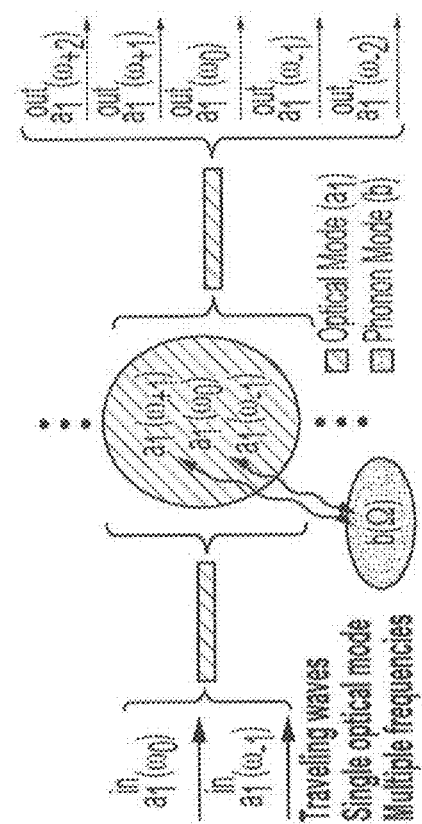
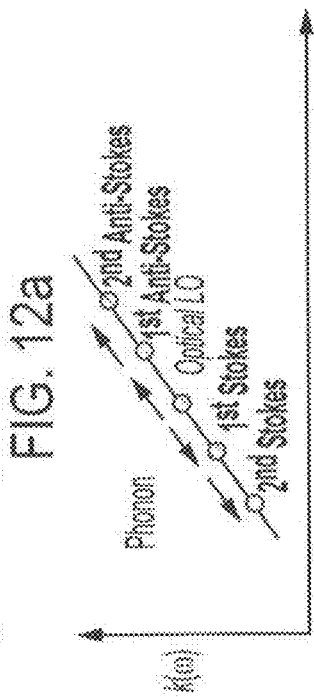
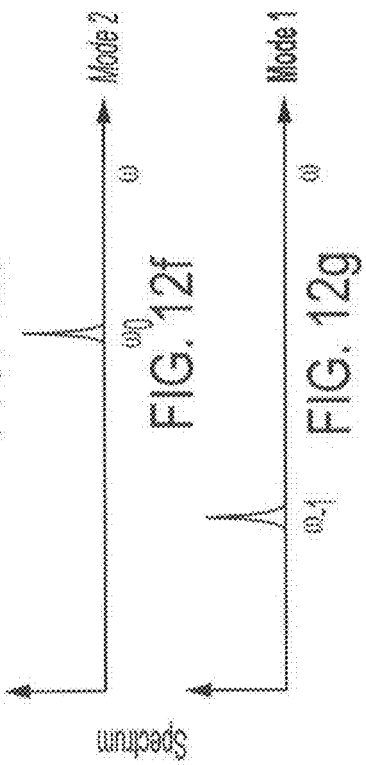
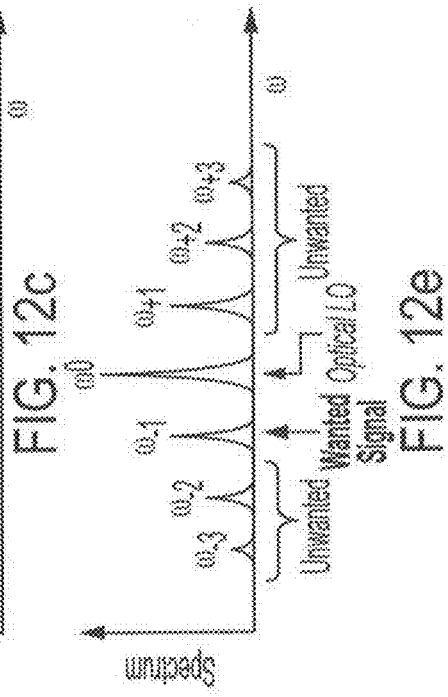
FIG. 12a, FIG. 12b, FIG. 12c, FIG. 12d, FIG. 12e, FIG. 12f, FIG. 12g

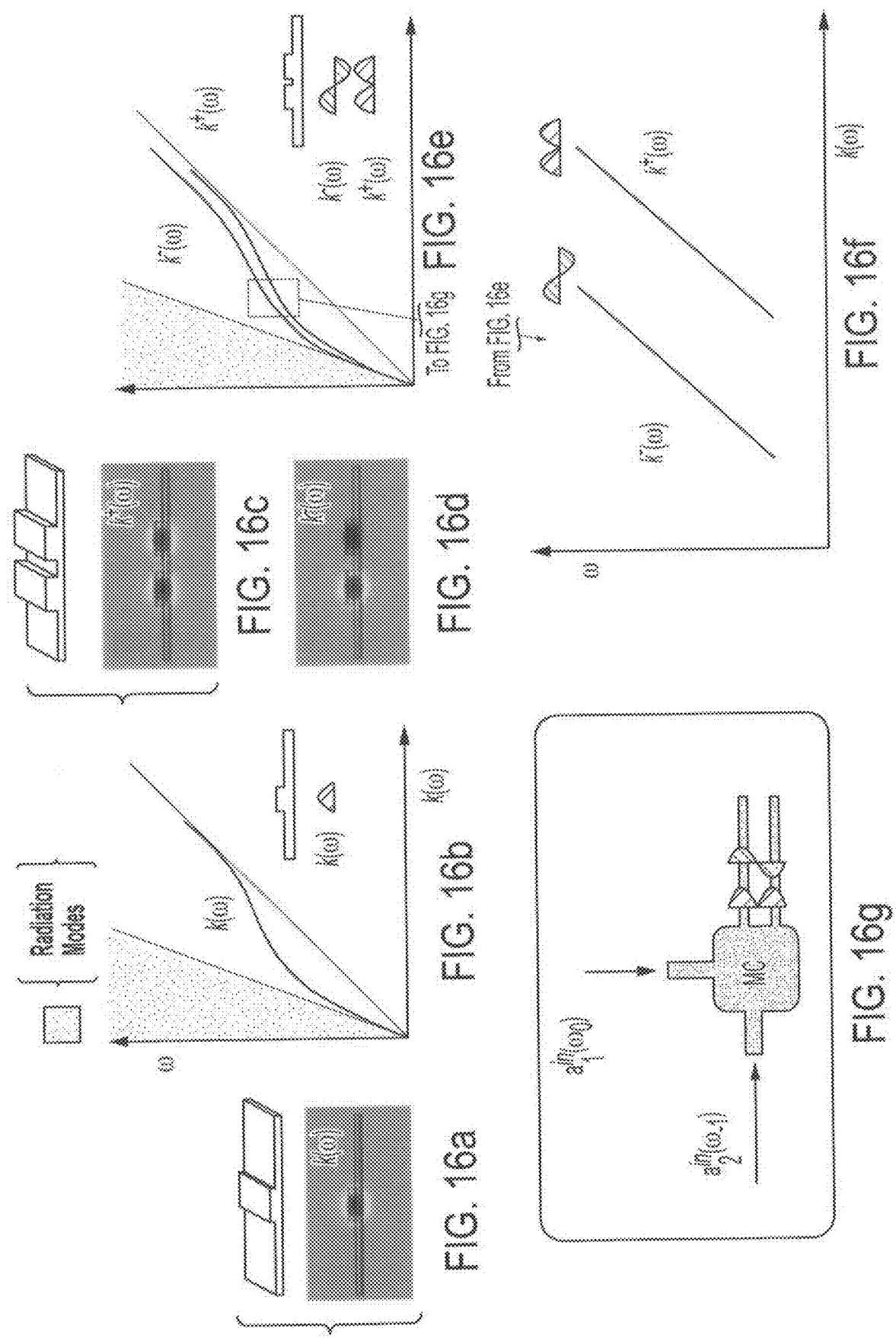

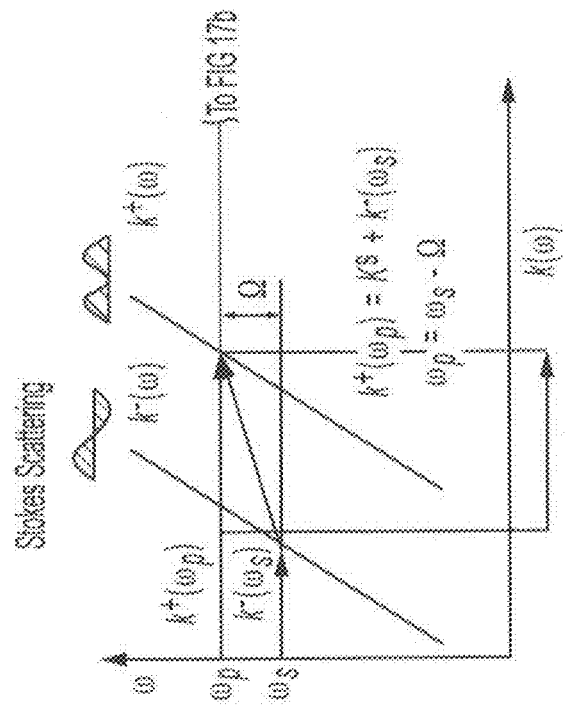
FIG. 17a
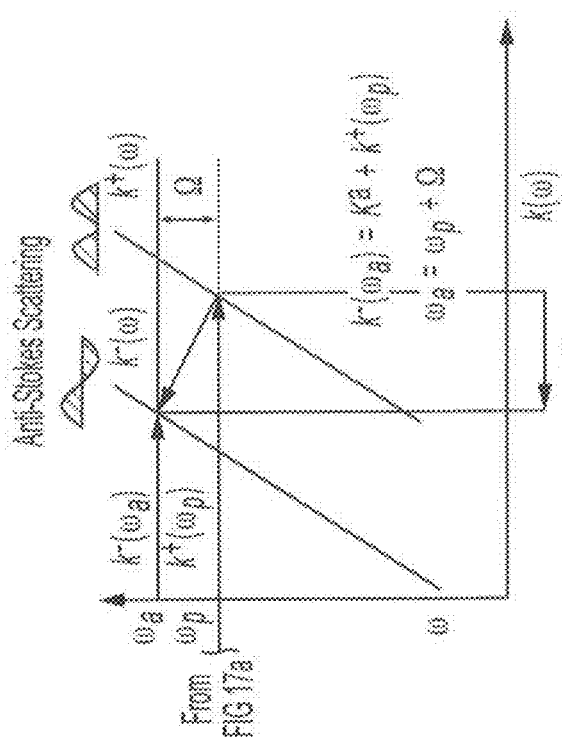
FIG. 17b
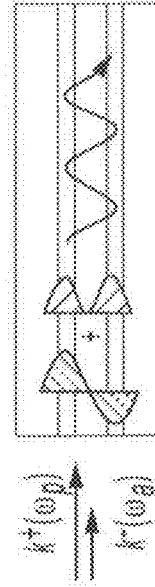
FIG. 17c
FIG. 17d
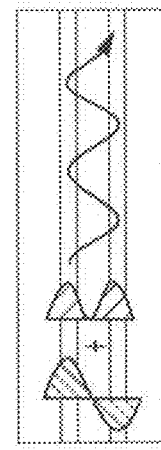
FIG. 17e
FIG. 17f

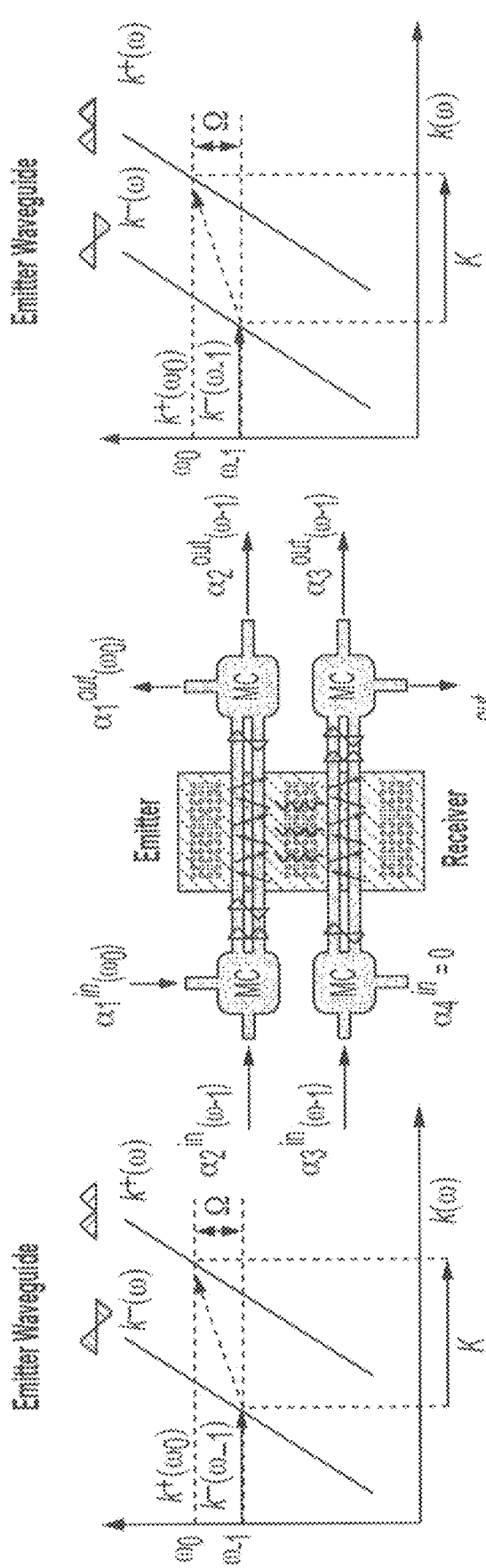
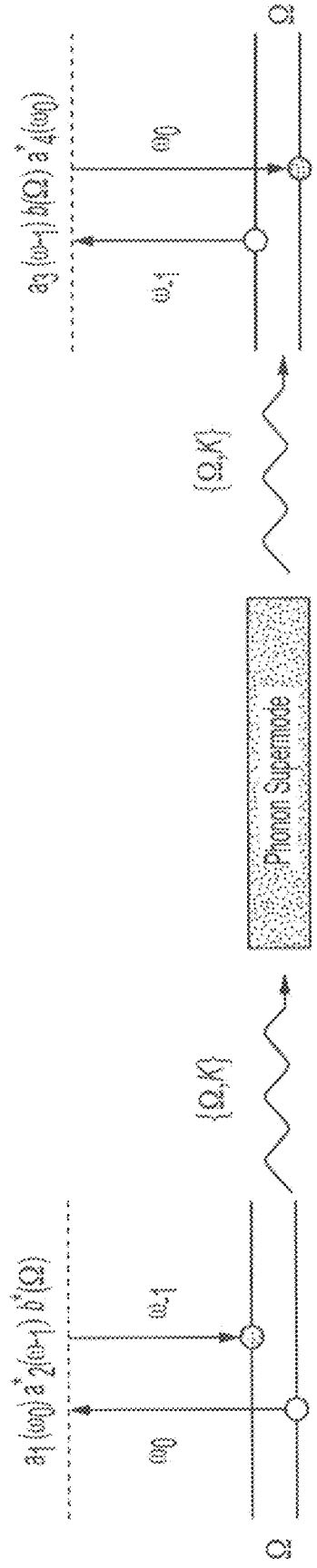
FIG. 18a
FIG. 18b
FIG. 18c
FIG. 18d
FIG. 18e ered by the Defense Advanced
OPTO-ACOUSTIC SIGNAL PROCESSING

CROSS-REFERENCE TO RELATED APPLICATIONS

This application claims priority under 35 U.S.C. § 119(e) to U.S. Provisional Application No. 62/717,299, filed Aug. 10, 2018 which is incorporated herein by reference in its entirety.

STATEMENT REGARDING FEDERALLY SPONSORED RESEARCH OR DEVELOPMENT

This invention was made with government support under N00014-16-1-2687 awarded by the Defense Advanced Research Projects Agency and under 1122492 from the National Science Foundation. The government has certain rights in the invention.

BACKGROUND OF THE INVENTION

The rapid development of complex integrated photonic circuits has led to a pressing need for robust isolator and circulator technologies to control signal routing and protect active components from back-scatter. While there have been great efforts to miniaturize existing Faraday isolators, it is fundamentally difficult to adapt these techniques to integrated systems since magneto-optic materials are intrinsically lossy and not CMOS-compatible.

SUMMARY OF THE INVENTION

One aspect of the invention provides for a device for opto-acoustic signal processing. In one embodiment, the device includes a structure configured to laterally confine travelling acoustic phonons (hypersound) throughout, a first multimode optical waveguide embedded within the structure, and an acoustic phonon emitter within the structure. The first multimode optical waveguide is selected to couple to the acoustic phonons (hypersound) confined within the structure.

This aspect of the invention can include a variety of embodiments.

In one embodiment, the acoustic phonon emitter is a piezoelectric or electromechanical device. In one embodiment, the structure configured to laterally confine travelling acoustic phonons (hypersound) throughout is a trench adjacent to the first multimode optical waveguide and the acoustic phonon emitter. In one embodiment, the acoustic phonon emitter is a second multimode optical waveguide, and the first multimode optical waveguide and the second multimode optical waveguide are optically isolated from each other as a result of different widths. In one embodiment, the first multimode optical waveguide and the second multimode optical waveguide are optically isolated from each other as a result of a sufficient lateral distance between the first multimode optical waveguide and the second multimode optical waveguide. In one embodiment, the sufficient lateral distance is at least a width of the first multimode optical waveguide. In one embodiment, the first multimode optical waveguide and the second multimode optical waveguide are optically isolated from each other as a result of additional optical features between the first multimode optical waveguide and the second multimode optical waveguide. In one embodiment, the first multimode optical waveguide and the second multimode optical waveguide are parallel.

In one embodiment, the device can further include an optical ring resonator in optical communication with the first multimode optical waveguide. In one embodiment, the device can further include one or more additional waveguides embedded within the structure and selected to couple to the acoustic phonons (hypersound) confined within the structure.

One aspect of the invention provides for a system for opto-acoustic signal processing. In one embodiment, the system includes a first light source optically coupled to a proximal end of the first multimode optical waveguide, the first light source emitting a probe wave having a frequency $\omega_p^{(1)}$, and a driver configured to drive the acoustic phonon emitter to emit acoustic phonons (hypersound).

This aspect of the invention can include a variety of embodiments.

In one embodiment, the acoustic phonons (hypersound) are induced through stimulated inter-modal Brillouin scattering (SIMS). In one embodiment, the system can further include a second light source optically coupled to a proximal end of the second optical waveguide, the first light source emitting a pump wave having a frequency $\omega_p^{(2)}$, a third light source optically coupled to the proximal end of the second optical waveguide, the second light source emitting a signal wave having a frequency $\omega_s^{(2)}$, where the third light source is coupled into a different optical mode or polarization from the second light source.

In one embodiment, the pump wave and the signal wave induce the acoustic phonon around a difference frequency $\Omega = \omega_p^{(2)} - \omega_s^{(2)}$. In one embodiment, the acoustic phonon produces mode conversion and a frequency shift to $\omega_s^{(1)} = \omega_p^{(1)} - \Omega$ or $\omega_{as}^{(1)} = \omega_p^{(1)} = \omega_p^{(1)} + \Omega$. In one embodiment, the mode conversion is unidirectional.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5a depicts a graph of frequency response with wavelength of $\lambda_p=1544.1$ nm and $\Delta q=-1422$ m$^{-1}$. FIG. 5b depicts a graph of frequency response with wavelength $\lambda_p=1548.4$ nm and $\Delta q=0$ m$^{-1}$ ("phase-matched"). FIG. 5c depicts a graph of frequency response with wavelength $\lambda_p=1549.3$ nm, $\Delta q=297$ m$^{-1}$. FIG. 5d depicts a graph of frequency response with wavelength $\lambda_i=1549.7$ nm, $\Delta q=428$ m$^{-1}$.

FIG. 6a depicts dimensions of the ridge waveguides used in NIBS measurements, and simulated x component of the electric field for the first two optical modes supported by the waveguide. FIG. 6b depicts calculated normalized transmission as a function of wavelength shows the phase-matching sinc-squared response in the forward and backwards directions. FIG. 6c provides an alternative ridge waveguide design with reduced ridge dimensions and angled sidewalls, resulting in a tenfold reduction in the difference of group indexes. FIG. 6d depicts calculated normalized transmission of a NIBS process using waveguides shown in FIG. 6c. The reduction of $\Delta n_g$ increases the bandwidth by a factor of 10.

In FIGS. 7a and 7b, significant mode conversion is achieved $\eta_f^2 \approx 1$ while in the backward direction light propagates through the device with only a small amount being mode-converted $\eta_b^2 \approx 1$.

wavelength is changed. As the pump is tuned from 1565 nm to 1530 nm, the modulator response is shifted down in wavelength by a corresponding amount. Data are plotted for forward (port M3,1→M4,2) operation (blue dots) and backward (port M4,2→M3,1) operation (red dots).

Figure 9A:
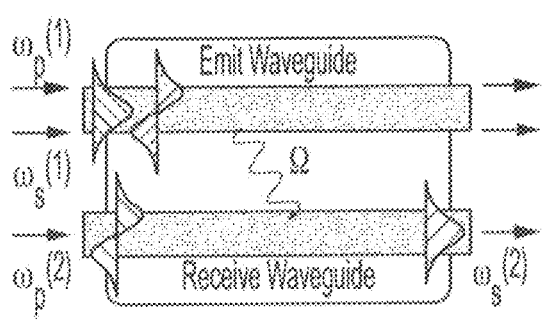
Figure 9B:
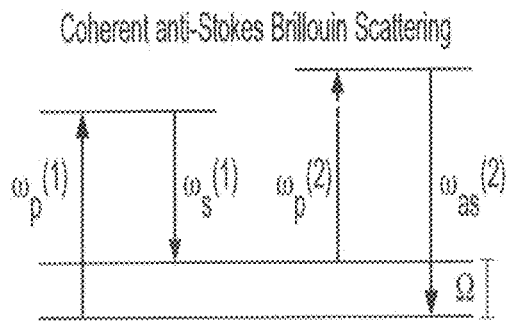
Figure 9C:
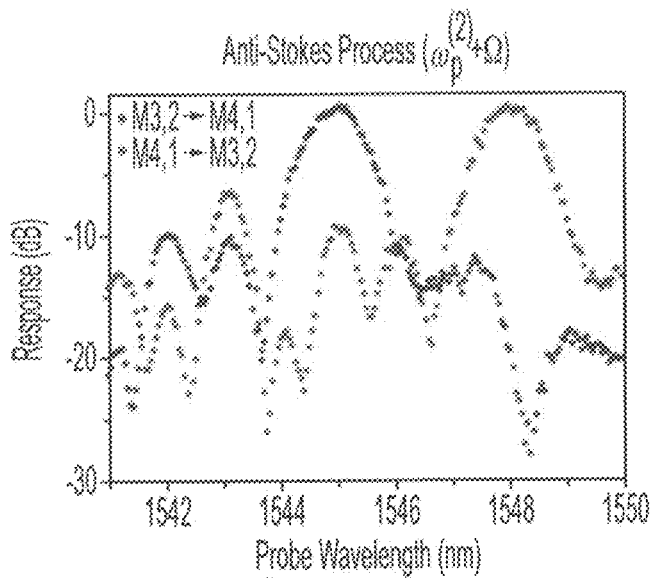
Figure 9D:
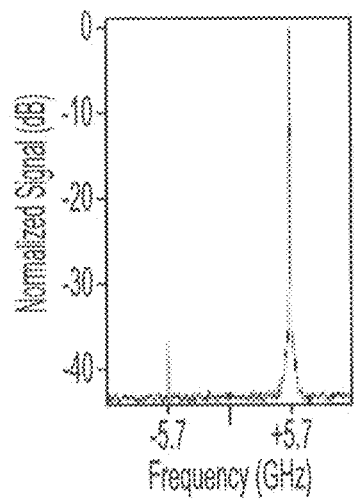
Figure 9E:
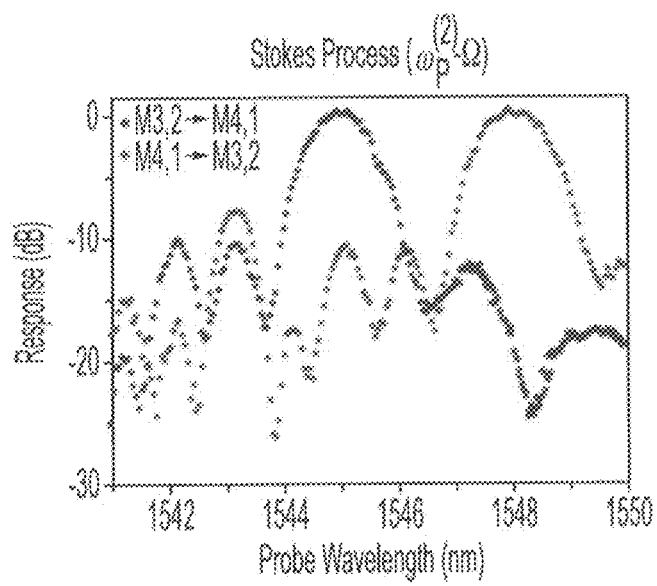
Figure 9F:
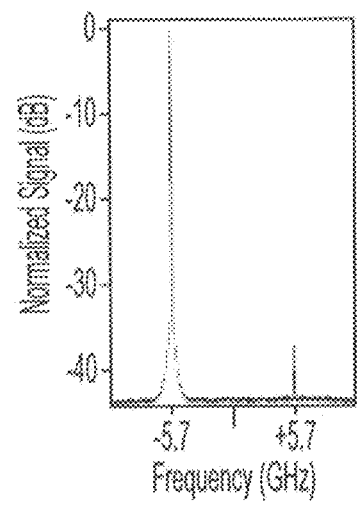

FIGS. 9a and 9b depict the device operation scheme and energy level diagram in analogy to FIG. 1. FIG. 9a illustrates a cartoon of nonlocal inter-band Brillouin scattering for the anti-Stokes process. While the phonon emission is unchanged from the text, light is incident in the anti-symmetric mode of the modulator waveguide. The phonon blue-shifts and mode converts this light as it traverses the device. FIG. 9b plots the energy level diagram for this coherent anti-Stokes Brillouin scattering process. FIG. 9c shows the anti-Stokes modulation response for light propagating in both directions through the modulator waveguide as a function of probe wavelength. FIG. 9d plots the corresponding output spectrum relative to a single optical incident field for a wavelength of 1548.3 nm. FIGS. 9e and 9f plot data for the Stokes process in the same device for comparison. FIG. 9e plots the forward-backward Stokes modulation response, while FIG. 9f plots the output spectrum at a probe wavelength of 1548.3 nm.

Figure 10:
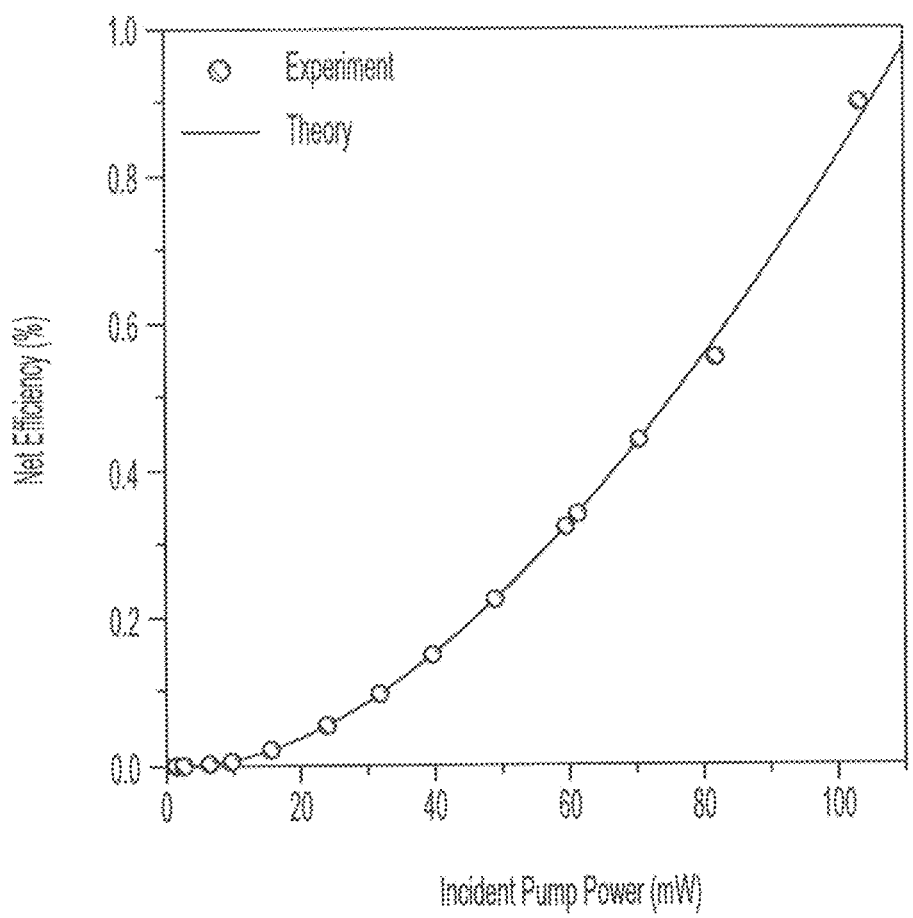

FIG. 10 depicts a graph of NIBS modulation efficiency for one device as a function of incident drive-waveguide pump power.

Figure 11A:
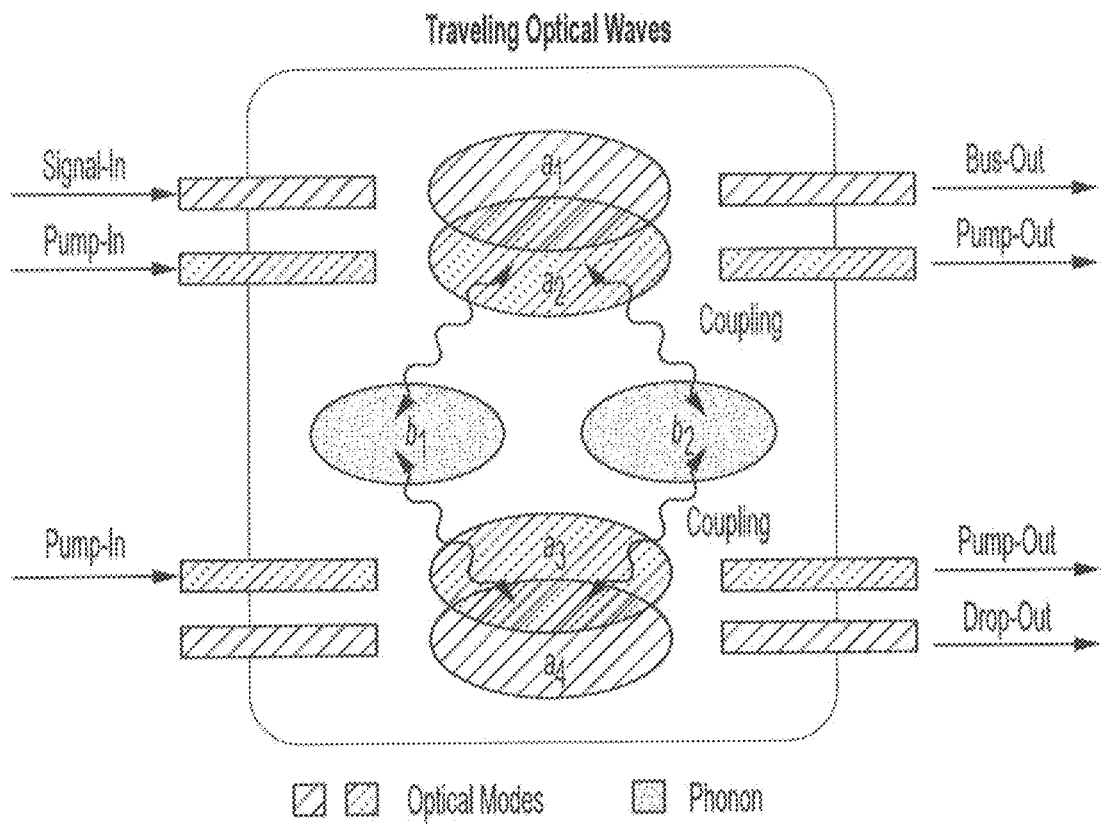
Figure 11B:
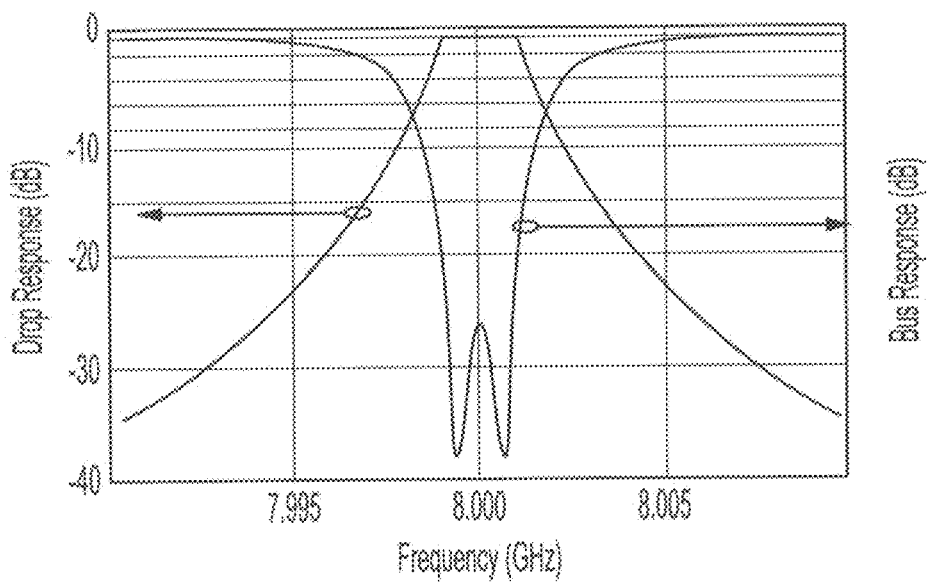

FIG. 11a illustrates a process for phonon mediated information transfer (phonon emit receive process) between 4-ports of a traveling-wave device. FIG. 11b depicts a two-pole transfer function produced by phonon emit-receive process. Utilizing a new form of symmetry breaking, competing interactions are eliminated, thereby achieving near unity quantum efficiency.

FIGS. 12a-12g illustrate schematics contrasting the physics of phonon mediated intra-modal (IM) and cross-modal (XM) coupling within traveling wave systems. FIGS. 12a and 12b diagram the interaction between a guided phonon mode, $b(\Omega)$, and traveling waves $a_j(\omega_k)$, where, $a_j(\omega_k)$ is the amplitude of $j^{th}$ spatial mode with a carrier frequency $\omega_k$. FIGS. 12c and 12d show the allowed transitions through phase matched photon-phonon coupling in the two systems. Note that only two frequencies are permitted to couple through cross-modal coupling. FIG. 12e shows the possible energy spectrum at the output of the system seen in FIG. 12a, while FIGS. 12f and 12g show the possible energy spectrum at the output of the system shown in FIG. 12b. Note that all unwanted interactions (and frequency components) are eliminated through cross-modal coupling.

Figure 13B:
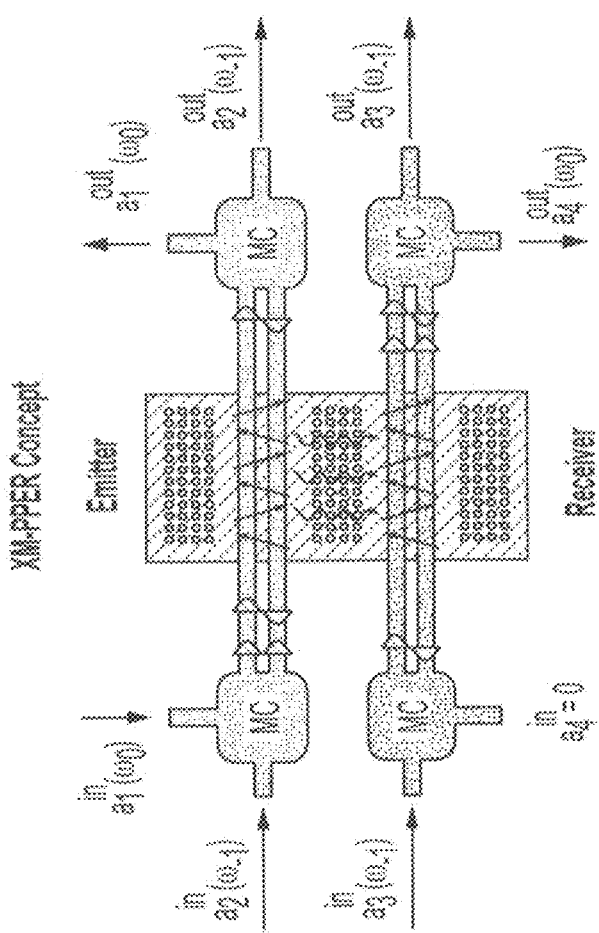
Figure 13A:
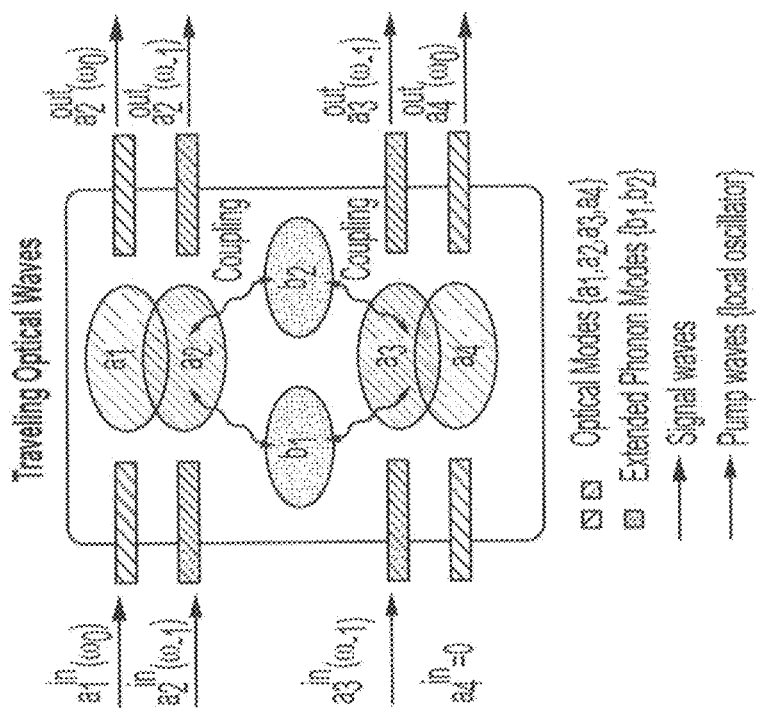

FIG. 13a depicts a schematic showing the phonon-mediated information transfer within single-stage XM-PPER device. FIG. 13b depicts the single-stage XM-PPER device. This system utilizes symmetric and antisymmetric waveguide modes to perform cross-modal (XM) coupling; these distinct guided optical modes are addressed via separate input (output) ports using a mode converter (MC). (Device physics discussed further in Section 1.2.)

Figure 14:
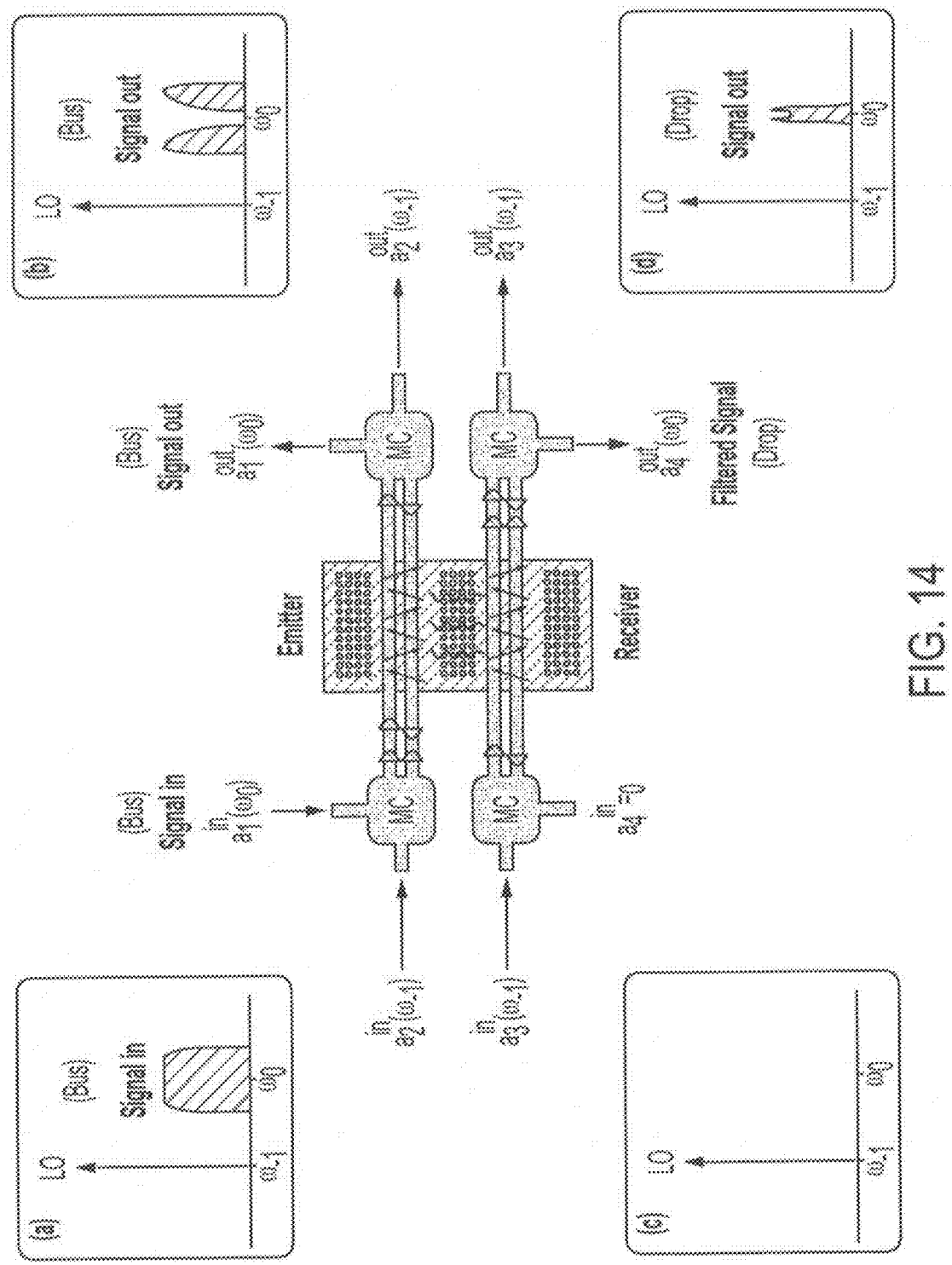

FIG. 14 depicts a diagram showing one of the basic signal processing function performed by the XM-PPER (center). The signals injected into the Emitter waveguide $\{a_1^{in}(\omega_0), a_1^{in}(\omega-1)\}$ are sketched in (a) and the output signals $\{a_1^{out}(\omega_0), a_1^{out}(\omega-1)\}$ are sketched in (b). Similarly, the signals injected into the Receiver waveguide $\{a_3^{in}(\omega-1), a_4^{in}(\omega_0)\}$ are sketched in (c) and the output signals $\{a_3^{out}(\omega-1), a_4^{out}(\omega_0)\}$ are sketched in (d). A wide band signal (blue) injected into port 1 experiences channel-dropping filter operation as seen in (a), (b), and (d).

Figure 15:
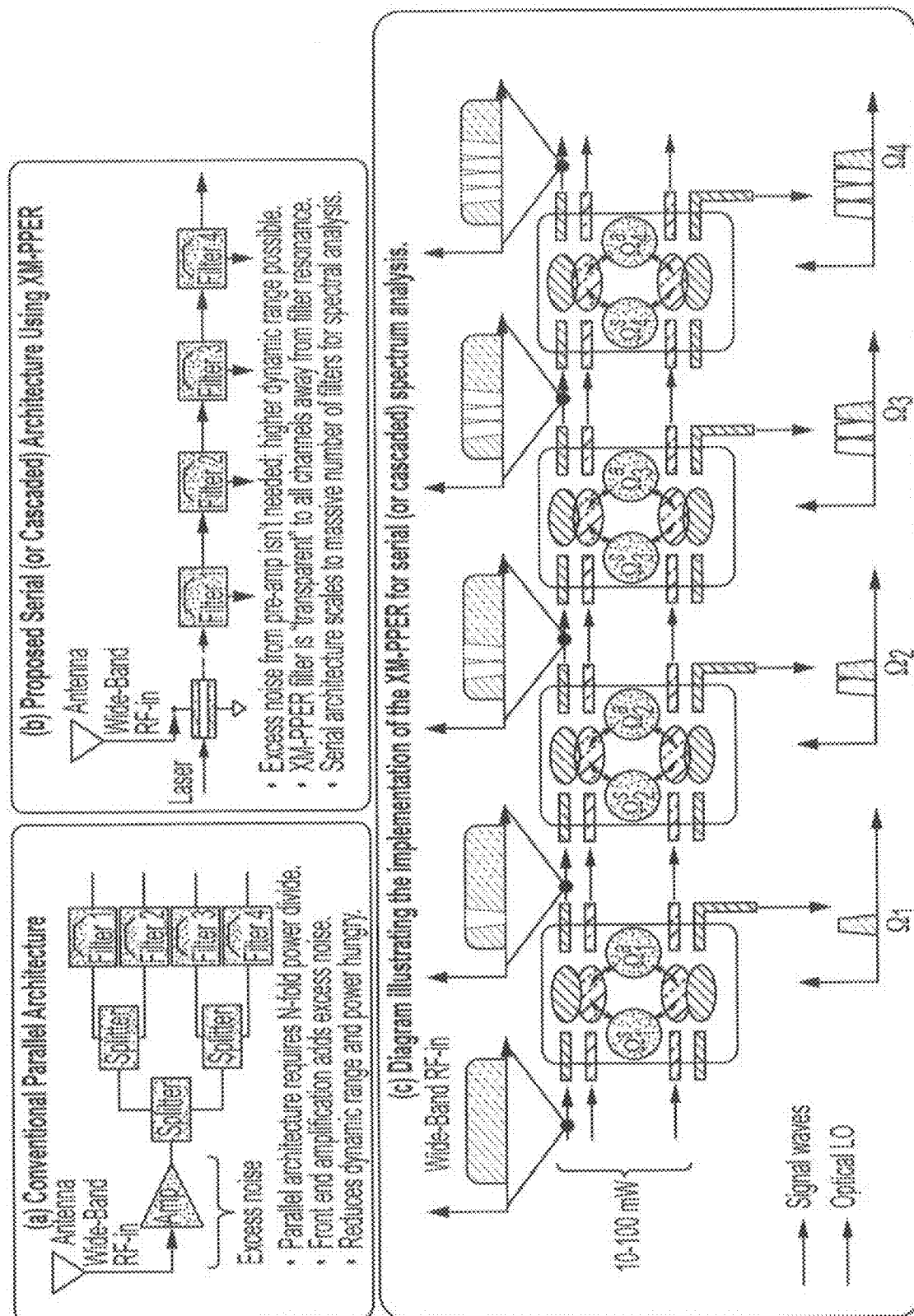

FIG. 15 depicts a schematic of a comparison of Parallel (a) and Serial (or Cascaded) (b) spectral analysis architectures. Portion (c) depicts a diagram illustrating how the a large network of XM-PPER devices can be used to perform Serial (or cascaded) signal processing.

FIGS. 16a-16g depict schematics of modal hybridization and coupling in a dual waveguide system. FIG. 16a depicts a computed field profile within a suspended single silicon ridge waveguide and FIG. 16b depicts a corresponding dispersion curve k(w). FIGS. 16c and 16d are the computed field profiles of the hybridized symmetric and antisymmetric wave-guide modes produced within a dual-core ridge waveguide. FIG. 16e illustrates dispersion curves for the symmetric (+) and antisymmetric (−) waveguide modes are seen in blue and red respectively. FIG. 16f illustrates a diagram illustrating the function of a mode converter (MC) used perform mode-multiplexing. FIG. 16g depicts a magnified view of the region of the dispersion curves pertinent to our device studies.

FIGS. 17a and 17b illustrate energy and momentum diagrams for the Stokes (FIG. 17a) and anti-Stokes (FIG. 17b) processes within a dual core waveguide. FIGS. 17c and 17d show the form of the modal interference that results from excitation of Stokes and anti-Stokes processes, respectively. FIGS. 17e and 17f show form of the guided phonon modes that satisfy energy and momentum conservation for the Stokes and anti-Stokes processes, resepctively.

FIGS. 18a and 18b illustrate phase matching and interaction in the Emitter waveguide (depicted in FIG. 18c). Similarly, FIGS. 18d and 18e show the phase matching diagram and 20 interaction taking place in the Emitter waveguide (depicted in FIG. 18c). Through this nonlocal phonon-mediated interaction (1) a signal photon $(a_1(\omega-1))$ is annihilated in the Port 1 to generate a signal phonon $(b(\Omega))$ which is then filtered converted back to the optical domain $(a_4(\omega-1))$ to exit Port 4. This interaction is mediated through interaction terms (1) and (4) of Eq. 1.1 as shown in (b) and (e).

Figure 19A:
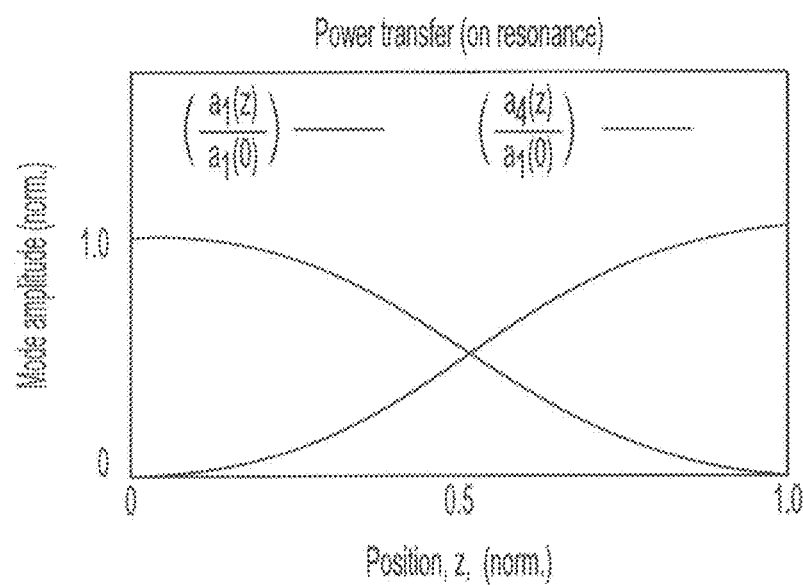
Figure 19B:
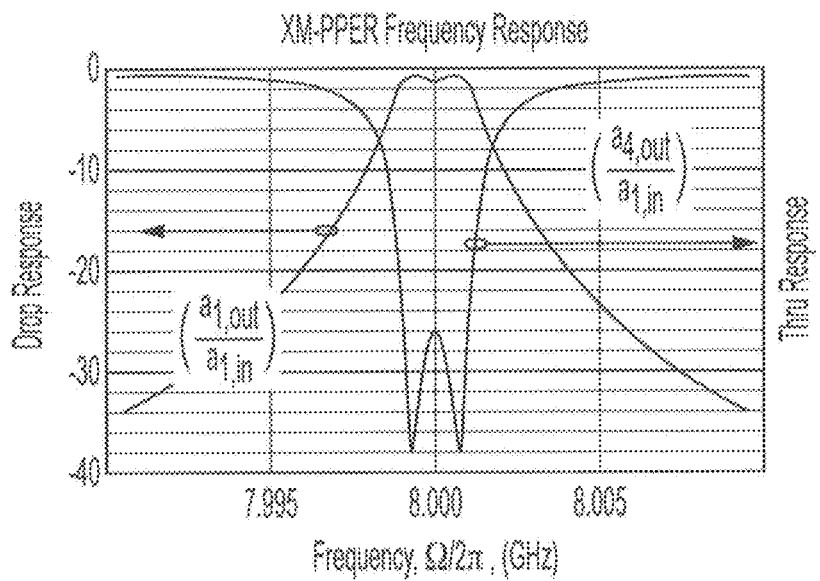

FIGS. 19a and 19b depict plots showing the efficiency of signal transfer between Emitter and Receiver waveguides within the XM-PPER (FIG. 19a) and phonon mediated 2-pole filter response (FIG. 19b).

Figure 20:
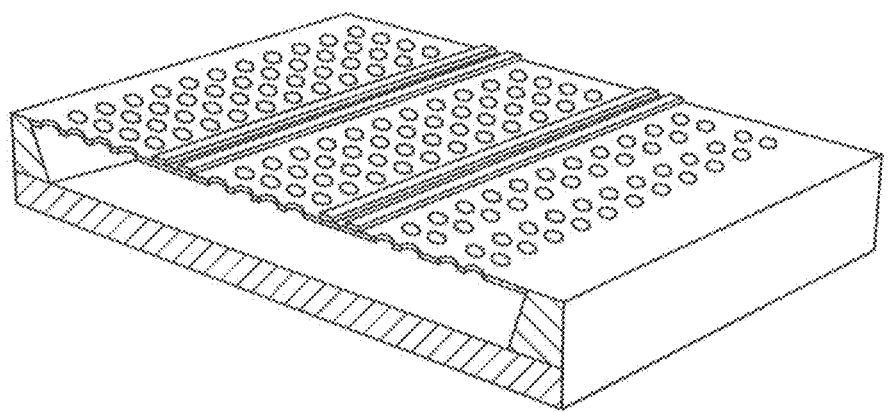

FIG. 20 illustrates a schematic showing an XM-PPER design. The structure in FIG. 20 depicts a total internal reflection or (TIR) XM-PPER design.

Figure 21A:
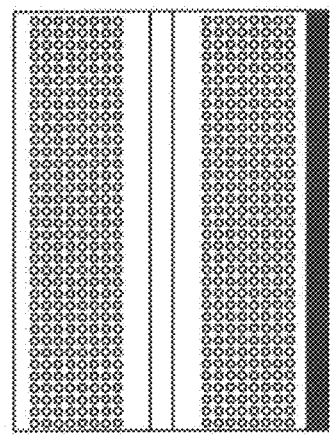
Figure 21B:
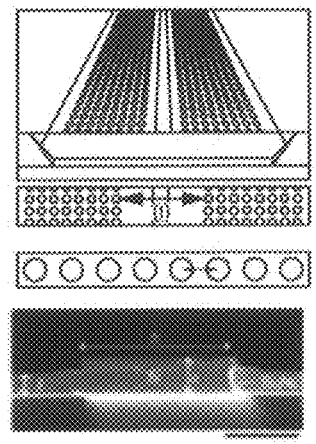
Figure 21C:
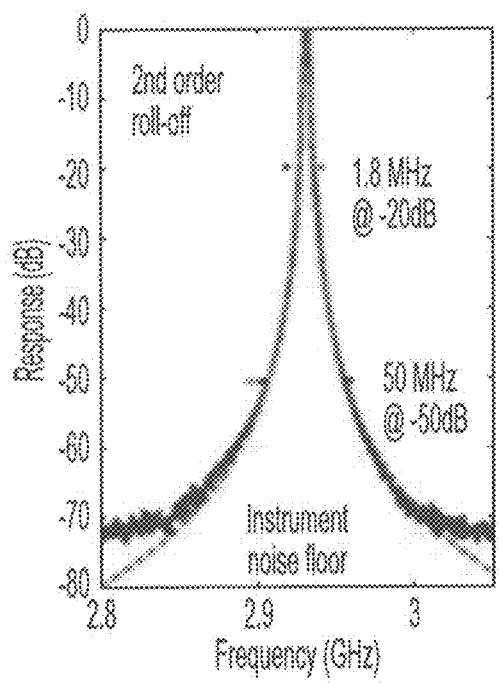
Figure 21D:
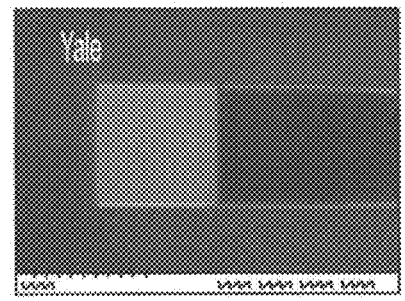
Figure 21E:
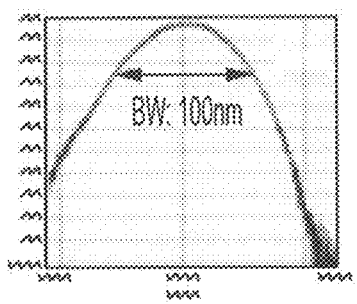

FIG. 21a illustrates hybrid photonic-phononic waveguides fabricated via e-beam. FIGS. 21b and 21c depict a Brillouin-active waveguide system and an experimental IM-PPER system. FIGS. 21d and 21e depict high efficiency fiber-to-chip grating coupler technology.

Figure 22A:
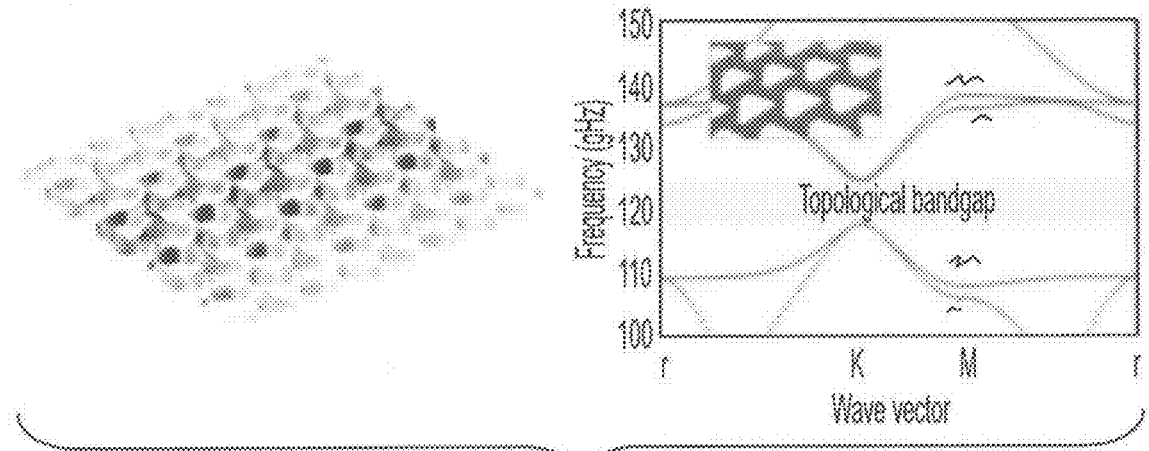
Figure 22B:
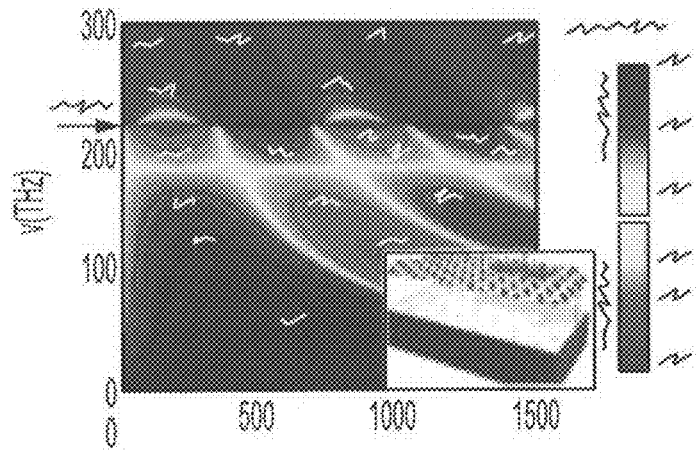
Figure 22C:
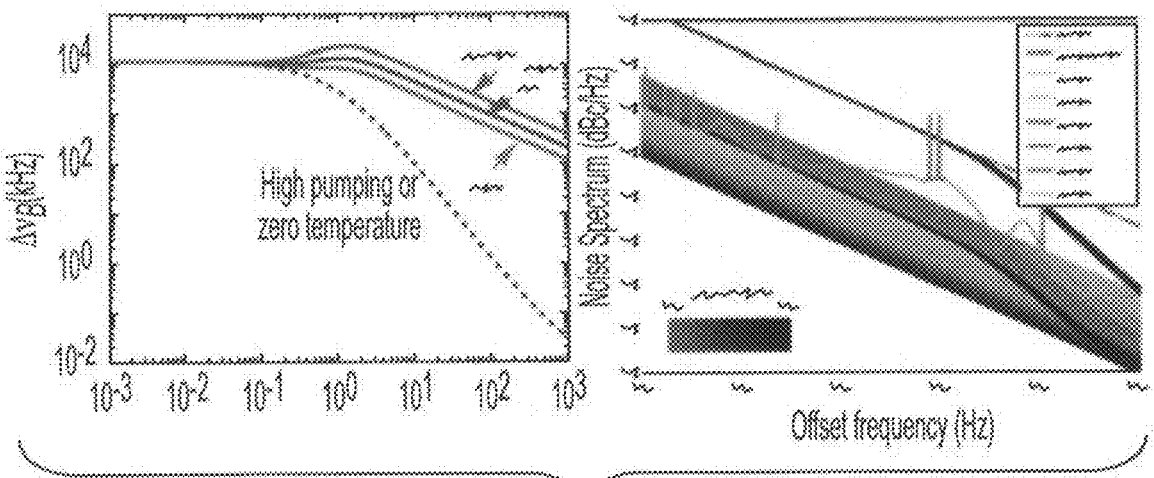

FIG. 22a illustrates phonon modes in complex structures: e.g. elastic-wave topological insulators. FIG. 22b illustrates strong photon-phonon interaction, e.g. in 2D material systems. FIG. 22c depicts a stochastic analysis of phase noise in optomechanical resonators.

Figure 23A:
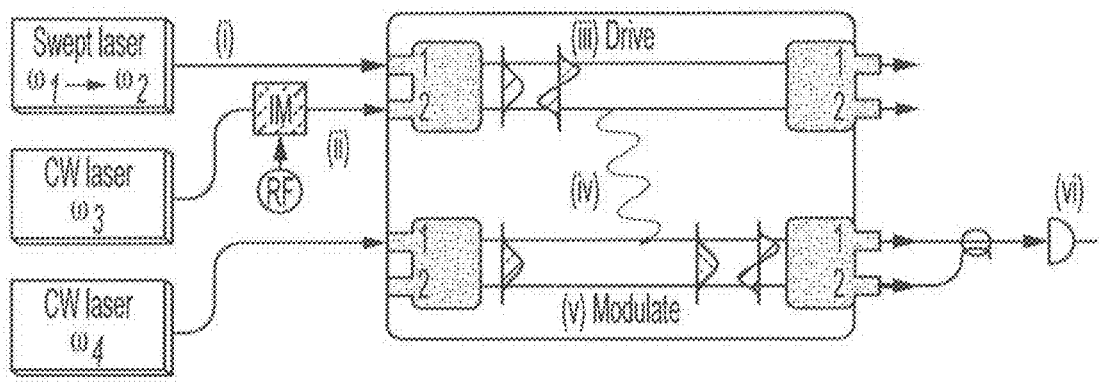
Figure 23B:
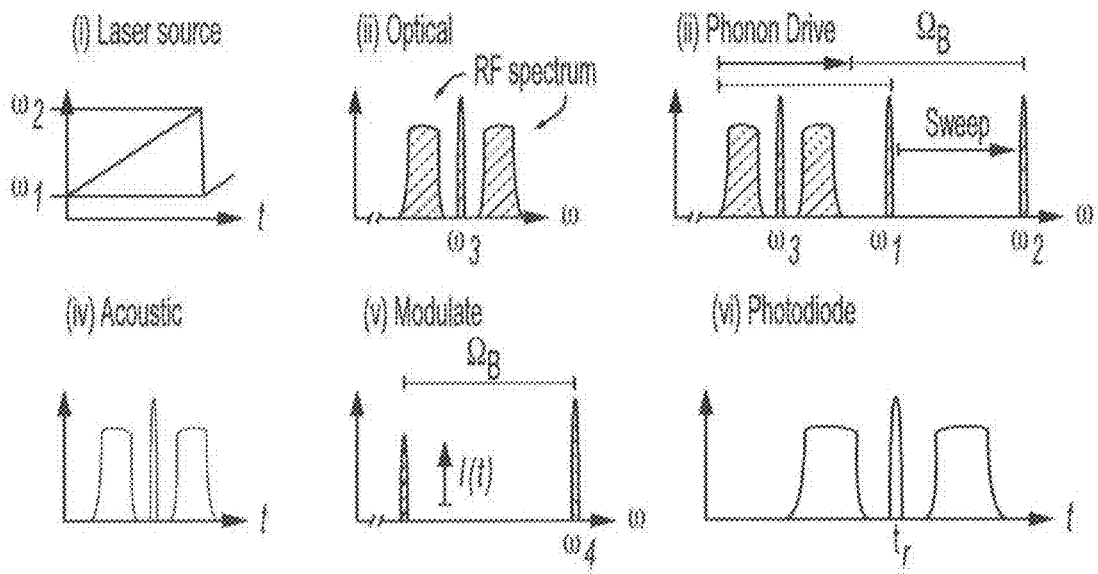

FIG. 23a depicts a schematic diagram of an RF spectrum analyzer utilizing a NIBS modulator device. FIG. 23b (i) depicts a laser source sweeps frequencies between $\omega_1$ and $\omega_2$. FIG. 23b (ii) depicts an RF signal modulated on an optical carrier $\omega_3$. FIG. 23b (iii) illustrates two optical fields separated by the Brillouin frequency generate an acoustic field with, as shown in FIG. 23b (iv), a time varying amplitude following the spectrum of the RF spectrum. FIG. 23b (v) illustrates a 'modulator' waveguide where the acoustic field interacts with a pump at $\omega_4$, generating a time varying optical field at $\omega_4-\Omega_B$ following the phonon intensity. FIG. 23b (vi) illustrates a measured difference in frequency results in a time trace proportional to the spectrum of the RF signal. The time trace can be mapped back to the frequency domain using the known sweep range ($\omega_1$; $\omega_2$) and a sharp peak at $t=t_r$ corresponding to $\omega(t_r)=\Omega_B+\omega_3$.

Figure 24:
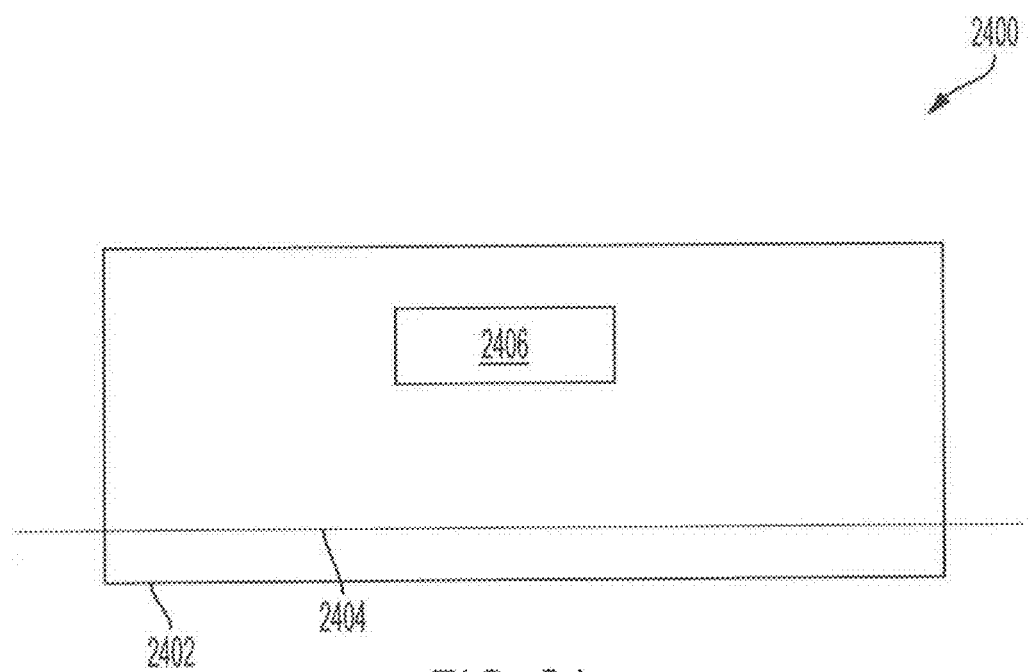

FIG. 24 illustrates a schematic of an opto-acoustic device 2400 according to an embodiment of the invention. A structure 2402 laterally confines travelling acoustic phonons (hypersound). Suitable structures 2402 can include a trench, which can, but need not surround the first multimode optical waveguide 2404 and the acoustic phonon emitter 2406.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate to perform the disclosed methods.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

DETAILED DESCRIPTION

I. Phase-Matching and Nonreciprocity

The nonreciprocal behavior of the inter-band modulation process is determined by the dispersion of the participating optical waves. Various relationships between device optical parameters, device operation bandwidth, and necessary conditions for significant nonreciprocal behavior are described below.

A. Inter-Band Modulator Phase-Matching Bandwidth

The bandwidth of device operation for the inter-band photonic modulator is explored here. In particular, here the bandwidth over which an incident phonon can scatter and frequency-shift light via an inter-band Brillouin scattering process is derived.

Figure 4A:
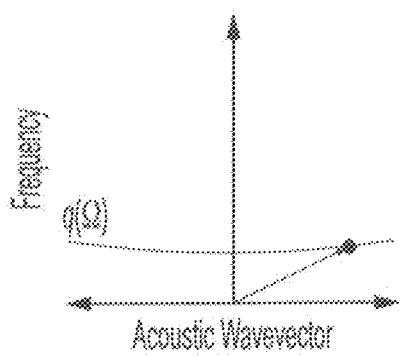
FIG. 4a depicts the dispersion relation for the acoustic phonon, which mediates the inter-band photonic transition.
Figure 4B:
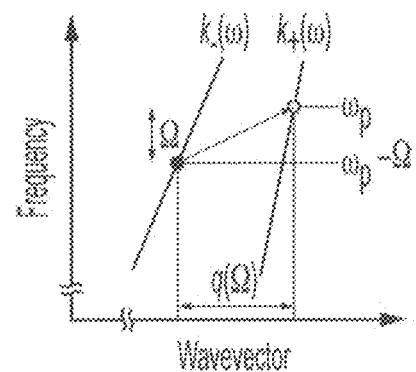
FIG. 4b depicts a phase-matching chart for the inter-band scattering process. An acoustic phonon with frequency and wavevector ($\Omega$, q($\Omega$)) mediates coupling between points on two distinct optical dispersion bands at $k_+(\omega_p)$ and $k_-(\omega_p-\Omega)$.

Consider an incident acoustic phonon with frequency $\Omega$ which is perfectly phase-matched to a Stokes scattering process between two optical dispersion branches, $k_+(\omega)$ and $k_-(\omega)$, at an optical probe frequency of $\omega=\omega_p$. This process is diagrammed in FIG. 4b. In this case, the phase-matching condition reads $$q(\Omega)=k_+(\omega p)-k_-(\omega p-\Omega) \qquad (1)$$

where $q(\Omega)$ is the dispersion relation of the acoustic phonon which mediates this process (FIG. 4a). This phase-matching condition requires that the sum of the wavevectors of the initial particle states is equal to the sum of the wavevectors of the final particle states.

Notation is simplified by writing the frequency-dependent diference between pump and Stokes optical wavevectors as $$\Delta k(\omega, \Omega)=k_+(\omega)-k_-(\omega-\Omega) \qquad (2)$$

so that the phase-matching condition can be rewritten as:

$$\Delta k(\omega_p, \Omega)-q(\Omega)=0 \qquad (3)$$

Figure 4C:
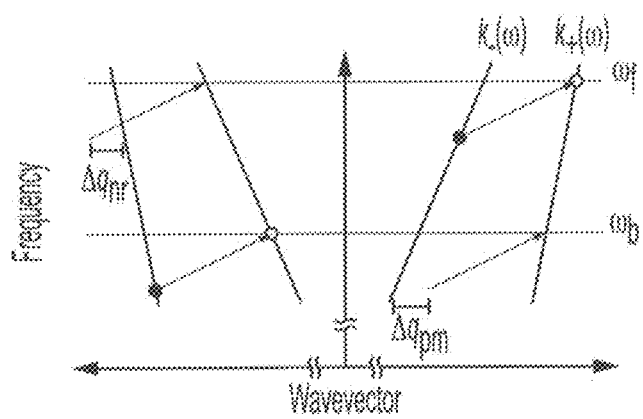
FIG. 4c illustrates in a chart how this process is perfectly phase-matched only at a single frequency $\Omega=\Omega_f$ when these two dispersion bands have different group velocities. This results in a frequency-dependent wavevector mismatch $\Delta q_{pm}$ as w is detuned from $\omega_f$. Furthermore, for the same incident phonon, light injected in the backward direction (left side of plot) at $w_f$ is not phase-matched to an inter-band transition, due to a wavevector mismatch $\Delta q_{nr}$. This nonreciprocal response results because the traveling-wave phonon breaks the symmetry between forward- and backward-propagating optical waves. However, the two sources of phase mismatch, $\Delta q_{pm}$ and $\Delta q_{nr}$ can exactly cancel, resulting in a phase-matched photonic transition in the backward direction at a frequency $\omega_b$.

Due to optical dispersion, as the probe frequency is detuned from $\omega_p$, this equation is no longer satisfied (right side of FIG. 4c), instead resulting in a wavevector mismatch for the scattering process $$\Delta k(\omega, \Omega)-q(\Omega)=\Delta q_{pm}. \qquad (4)$$

As light propagates through the active device region over a length L, this results in an accumulated phase mismatch $\Delta q_{pm}L$ for the inter-band scattering process. The frequency-dependent wavevector mismatch relative to $\omega_p$ can be written as $$\Delta q_{pm}=\Delta k(\omega, \Omega)-\Delta k(\omega_p, \Omega)=(k_+(\omega)-k_+(\omega_p))-(k_-(\omega-\Omega)-k_-(\omega_p-\Omega)) \qquad (5)$$

Assuming linear dispersion (i.e. constant optical group velocity) over the entire phase-matching bandwidth (an excellent approximation for typical integrated systems), Taylor expansion can be done to first order around w to find:

$$\Delta q_{pm} = \frac{\partial k_+}{\partial \omega}(\omega - \omega_p) - \frac{\partial k_-}{\partial \omega}(\omega - \omega_p) \qquad (6)$$

or $$\Delta q_{pm} = \frac{n_{g,+} - n_{g,-}}{c}\Delta\omega. \qquad (7)$$

Here $n_{g,+}$ and $n_{g,-}$ are defined to be the group velocities of the two optical modes, and $\Delta\omega=\omega-\omega_p$ to be the frequency difference between the experimental probe frequency and the frequency for which light is perfectly phase-matched to a scattering process. It should be noted that the frequency-dependent phase mismatch is minimized when the optical group velocities of the two modes are equal (i.e. when their dispersion curves are parallel at the operating frequency).

For a device of finite length, the resulting modulation strength has a sinc-squared response $\alpha\,\text{sinc}^2\,(\Delta q_{pm}L/2)$ (see section (1)(E)). This response envelope is equal to 1/2 when $\Delta qL/2=1.39$ and has nulls at $\Delta qL/2=n\pi$ where n is an integer.

Therefore, the full-width at half-maximum of the modulation response is $$\Delta\omega_{FWHM} = 2\Delta\omega = \frac{4 \cdot 1.39 c}{L}\frac{1}{|n_{g,+} - n_{g,-}|}, \qquad (8)$$

which can be written in units of frequency as:

$$\Delta f_{FWHM} = 2\Delta f = \frac{2 \cdot 1.39 c}{\pi L}\frac{1}{|n_{g,+} - n_{g,-}|}. \qquad (9)$$

This quantity represents the operating bandwidth of the inter-band photonic modulator.

B. Forward/Backward Modulation Phase Mismatch

The modulation wavevector (and hence phase) mismatch between scattering processes for light propagating in the forward and backward directions of the inter-band modulator was derived next. This direction-dependent phase mismatch permits the nonreciprocal response of the NIBS process.

Through operation of the photonic modulator, light injected into the device in the forward direction is mode-converted via an incident phonon. By contrast, light injected in the backward direction at the same frequency is not affected by this phonon if the inter-band scattering process is not phase-matched. This situation is discussed (diagrammed in FIG. 4c) here.

Figure 2A:
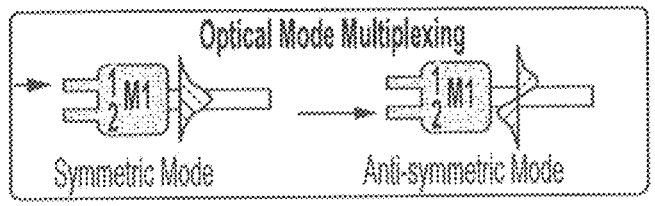
FIG. 2a diagrams the operation of mode multiplexers used to address symmetric and anti-symmetric waveguide modes.
Figure 2B:
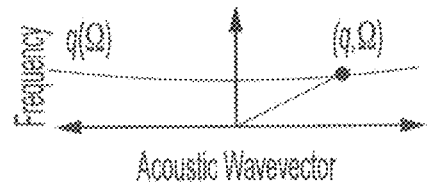
FIG. 2b plots the dispersion relation of the acoustic phonon mode which mediates the NIBS process.
Figure 2C:
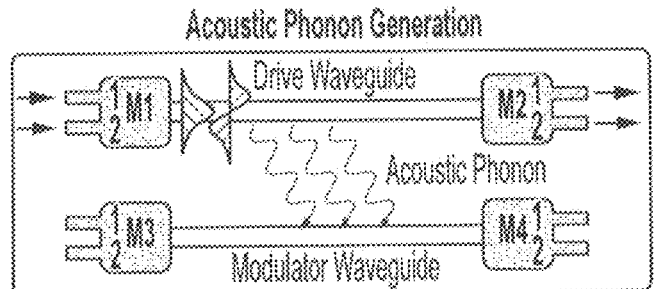
FIG. 2c depicts the acoustic phonon generation process. Two strong pump waves detuned by a frequency $\Omega$ are coupled into separate optical modes of the drive waveguide. These optical fields drive a monochromatic acoustic phonon through a SIMS process. This phonon is then incident on the spatially distinct modulator waveguide. Phase matching for this process is depicted in FIG. 2d. The acoustic phonon wavevector and energy mediate an inter-band photonic transition between initial (open circle) and final (closed circle) states on distinct optical dispersion curves.
Figure 2D:
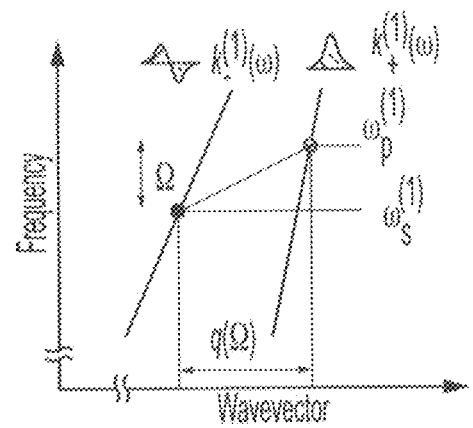
FIGS. 2e and 2f depict the response of the modulator waveguide when light is injected in two separate ports. In the forward operation depicted in FIG. 2e, light injected into port 1 of M3 is scattered from the symmetric to the anti-symmetric mode and frequency-shifted by the incident phonon before exiting the device through port 2 of M4. By contrast, in the backward operation depicted in FIG. 2f, light incident in port 2 of M4 is unaffected by the acoustic wave and propagates unchanged in the anti-symmetric mode before exiting the device through port 2 of M3. These behaviors can be understood through the phase-matching diagrams in FIG. 2g. In the forward direction (right side), the phonon is phase-matched to a photonic transition between symmetric and anti-symmetric modes. However, in the backward direction (left side) there is a wavevector mismatch Δq resulting from the nonzero group velocities of the optical modes. As a result, the same phonon does not mediate an inter-band photonic transition in the backward direction.
FIG. 2h plots the effect of optical dispersion on phase-matching for these processes. Because the two optical modes do not have the same group velocity, as the wavelength of injected light is changed from the phase-matched value it accumulates a wavevector mismatch $\Delta q_{pm}$. This phase walkoff results in a finite phase-matching bandwidth for the scattering process, but can also balance the nonreciprocal wavevector mismatch Δq, to enable scattering in the backward propagation direction, resulting in the transmission spectra plotted in FIG. 2i.
Figure 2E:
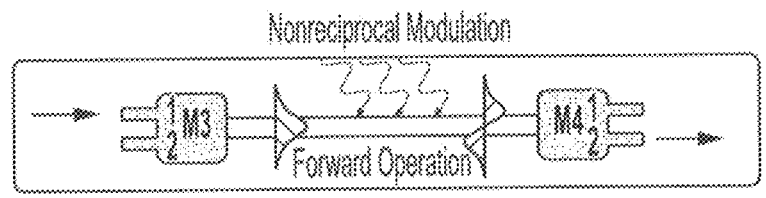
Figure 2F:
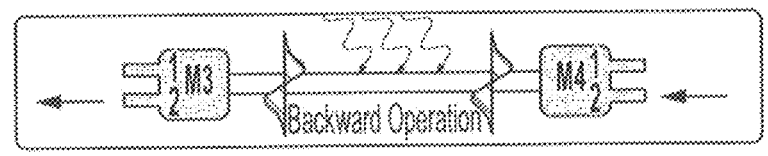
Figure 2G:
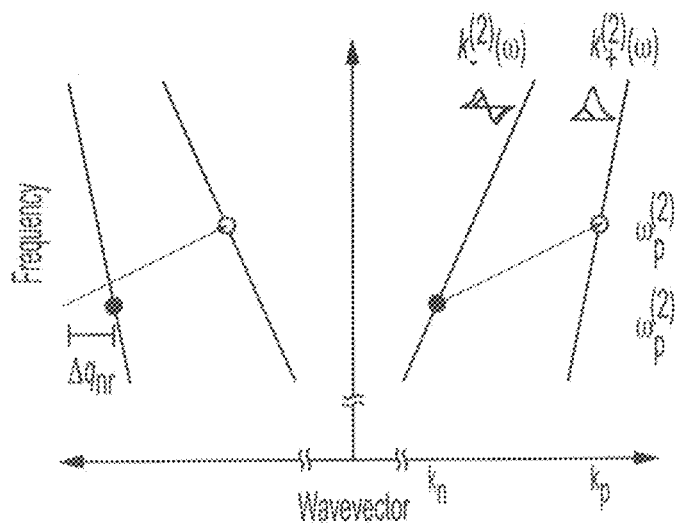
Figure 2H:
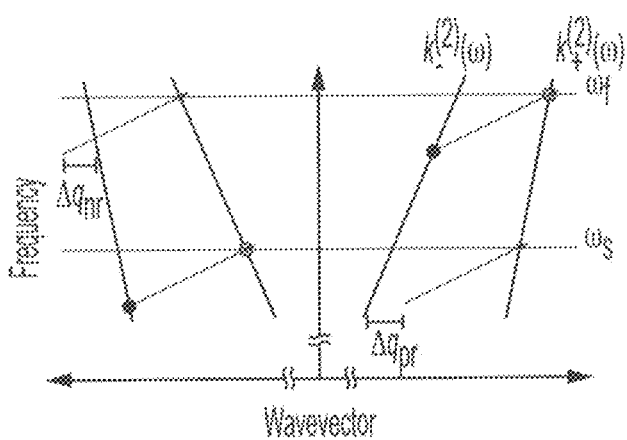

Again consider that light propagating in the forward direction with a frequency $\omega_f$ that is phase-matched to a scattering process through an incident phonon with frequency $\Omega$, as in FIG. 2h. The phase-matching condition reads:

$$q(\Omega) - \Delta q_{nr} = k_+(\omega_f) - k_-(\omega_f - \Omega) \qquad (10)$$

However, for light injected at the same frequency in the backward direction (left side of FIG. 4c), a modified phase-matching equation was found:

$$q(\Omega) - \Delta q_{nr} = k_+(\omega_f - \Omega) - k_-(\omega_f). \qquad (11)$$

Here a wavevector shift term $\Delta_{gnr}$ is introduced. This originates from the traveling acoustic wave which breaks symmetry between forward- and backward-propagating optical waves; however, we will see that its magnitude depends only on the group velocities of the optical waves and the Stokes frequency shift. It is possible to calculate this wavevector by subtracting the two conditions:

$$\Delta q_{nr} = k_+(\omega_f) - k_+(\omega_f - \Omega) + k_-(\omega_f - \Omega) \qquad (12)$$

Once again assuming linear dispersion around the operating bandwidth, this term can be approximated as $$\Delta_{q_{nr}} = \frac{\partial k_+}{\partial \omega}(\Omega) + \frac{\partial k_-}{\partial \omega}(\Omega) = \frac{n_{g,+} + n_{g,-}}{c}\Omega. \qquad (13)$$

When light propagates in the backward direction, scattered Stokes light accumulates a relative phase mismatch $\Delta_{q_{nr}}L$, where L is the device length. Provided that $\Delta_{q_{nr}}L \gg 1$, the modulation process will not be phase-matched. This is the necessary condition for nonreciprocal operation.

Figure 4D:
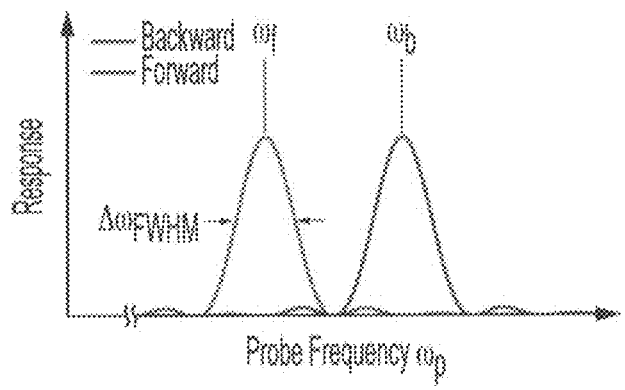
FIG. 4d depicts a plot of the expected modulation response (inter-band power conversion efficiency) of the device resulting from the interplay of these effects when light is injected in either the forward or the backward direction.
Figure 5A:
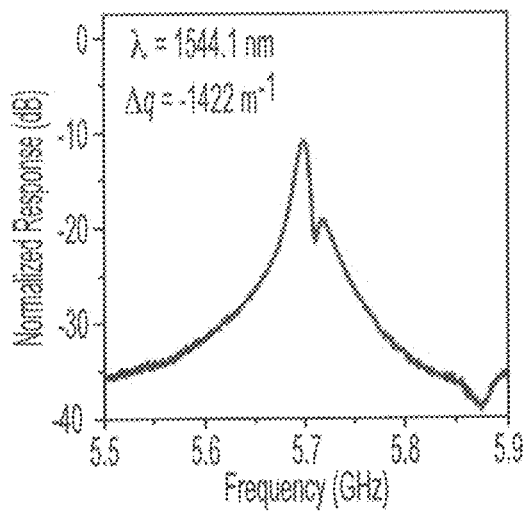
FIGS. 5a-5d depict graphs of frequency response of the NIBS modulator as the probe wavelength, and hence wavevector mismatch, is varied.
Figure 5B:
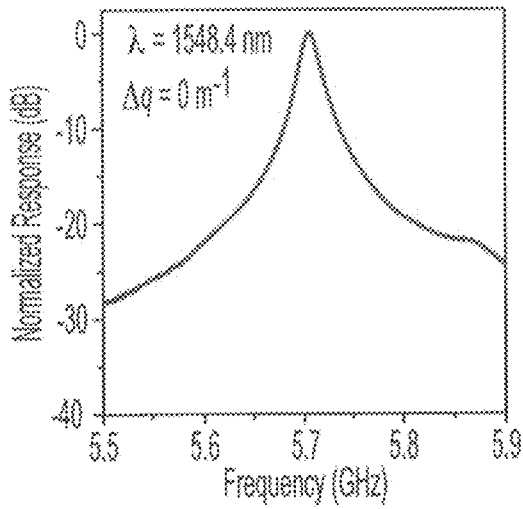
Figure 5C:
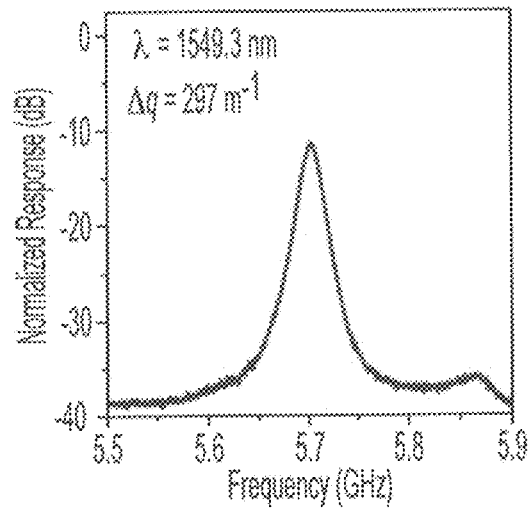
Figure 5D:
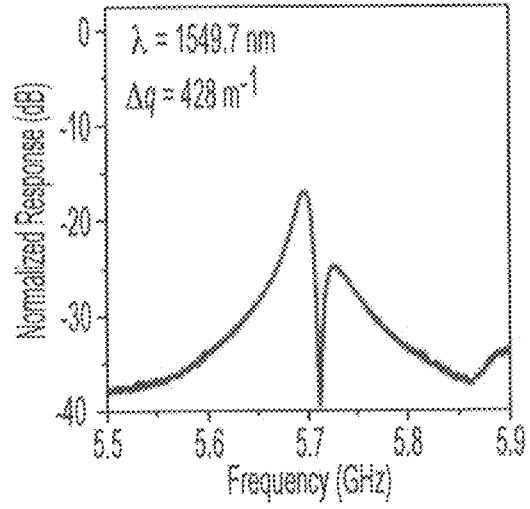

Interestingly, backward-propagating light may be phase-matched to an inter-band scattering process at a nearby frequency $\omega_b$ when the nonreciprocal wavevector mismatch $\Delta_{q_{nr}}$ is cancelled by the dispersive wavevector mismatch $\Delta_{q_{pm}}$. This results in a typical forward/backward modulation response diagrammed in FIG. 4d. The frequency difference between $\omega_b$ and $\omega_f$ can be calculated by requiring that $\Delta_{q_{nr}} = \Delta_{q_{pm}}$:

$$\frac{n_{g,+} - n_{g,-}}{c}(\omega_f - \omega_b) = \frac{n_{g,+} + n_{g,-}}{c}\Omega. \qquad (14)$$

This simplifies to:

$$\omega_f - \omega_b = \frac{n_{g,+} + n_{g,-}}{n_{g,+} - n_{g,-}}\Omega. \qquad (15)$$

This splitting is larger when the dispersion curves for the two modes are more nearly parallel, so that an appreciable frequency difference for light is required to supply the necessary phase mismatch. For devices with measured group indices $n_{g,+}=4.0595$ and $n_{g,-}=4.1853$, and $\Omega_B=2\pi 5.70$ GHz, $\Delta_\omega \approx 65.5$ QB=$2\pi 374$ GHz. This corresponds to a 3 nm wavelength-splitting at an optical probe wavelength of 1540 nm, which agrees very well with measured data.

C. Essential Condition for Significant Nonreciprocity

It was observed that both the phase-matching bandwidth and nonreciprocal frequency splitting for the NIBS process scale inversely with the difference of optical group indices. 10 Therefore, reducing this difference directly increases the bandwidth of operation, and also increases the frequency-splitting between forward and backward phase-matching. For a significant nonreciprocal response to occur, however, it is ideal to have the splitting between forward and backward modulation frequencies be much larger than the operation bandwidth. Derived here is a general characteristic length for this condition to be satisfied.

To have a large frequency-splitting to bandwidth ratio, it is required that the half-width at half-maximum (HWHM) bandwidth of the modulator response is much smaller than $|\omega_f - \omega_b|$:

$$\frac{2 \cdot 1.39 c}{L} \frac{1}{|n_{g,+} - n_{g,-}|} \ll \frac{n_{g,+} + n_{g,-}}{|n_{g,+} - n_{g,-}|}\Omega \qquad (16)$$

which gives a fundamental length scale for "good" nonreciprocity to occur:

$$L \gg \frac{2.78 c}{\Omega(n_{g,+} + n_{g,-})} \qquad (17)$$

which is 2.8 mm for the silicon waveguides used in the NIBS modulator. The current-generation devices have lengths of 2.4 cm, which seems to satisfy this condition reasonably well, even in the presence of fabrication inhomogeneities. Note that this condition necessitates the use of either a large frequency shift Q, or a long device length L to achieve nonreciprocity through traveling-wave inter-band photonic transitions of this type.

D. Effect of Different Waveguide Core Sizes on Phase-Matching

To inhibit optical cross-talk, the drive and modulator waveguides of the NIBS modulator used in the main text are designed to have different core widths. As a result, the phonon mode generated in the drive waveguide at optical wavelength Ad phase matches to inter-band scattering in the modulator waveguide at a disparate wavelength $\lambda_m$. The relationship between these two wavelengths can be determined through the phase-matching requirement for the Brillouin process:

$$\frac{2\pi}{\lambda_d}(n_{p,+}^{(1)}(\lambda_d) - n_{p,-}^{(1)}(\lambda_d)) = \frac{2\pi}{\lambda_m}(n_{p,+}^{(2)}(\lambda_m) - n_{p,-}^{(2)}(\lambda_m)). \qquad (18)$$

Here $n_{(p,+)}^{(1)}$ and $n_{(p,+)}^{(2)}$ are the phase indices for the symmetric modes of the drive and modulator waveguides, respectively, and $n_{(p,-)}^{(1)}$, and $n_{(p,-)}^{(2)}$ are the phase indices for the anti-symmetric modes. This condition can be written more succinctly as $$\frac{\lambda_m}{\lambda_e} = \frac{n_{p,+}^{(2)} - n_{p,-}^{(2)}}{n_{p,+}^{(1)} - n_{p,-}^{(1)}}. \qquad (19)$$

This condition can be used to design devices which operate across very different wavelength bands. For example, by designing a dual-core NIBS modulator with drive core width $\omega=1.5$ μm $(n)_{(p,+)}^{(1)} - n_{(p,-)}^{(1)} = 0.112$ at $\lambda=1550$ nm) and modulator core width $\omega=2.18$ μm ($n_{(p,+)}^{(1)} - n_{(p,-)}^{(1)} = 0.112$ at $\lambda = 2100$ nm), modulation can in principle be driven using optical waves>500 nm away from the probe wavelength.

E. Phase-Mismatched Lineshape

When the NIBS scattering process is perfectly phase-matched, the frequency response of modulation efficiency gives the expected Lorentzian-like lineshape determined by the lifetime of the resonant phonon mode. However, if the probe wave is slightly detuned from the ideal wavelength for phase-matching, then the scattered light accumulates a frequency-dependent phase mismatch relative to the probe according to Eq. 7 as it traverses the device. In this case, the frequency response of the modulation efficiency can take on many new shapes, including asymmetric lineshapes, sharp frequency rolloffs, and notch-like features. Several of these lineshapes are plotted as a function of wavevector mismatch (probe wavelength) in FIG. 5

Although inhomogeneities in device fabrication complicate the exact behavior of phase-matching in these devices, all of these lineshapes can be reproduced using a simple model that includes (1) a constant wavevector mismatch $\Delta q_{pm}$ along the device and a change in Brillouin frequency along the device length. The latter is known to occur in nanoscale Brillouin devices, resulting in broadening of the resonance lineshape, but plays an additional role here.

Let the amplitudes of the drive-waveguide optical waves be $a_{(p)}^{(1)}$ and $a_{(s)}^{(1)}$ and the amplitude of the probewave in the modulator waveguide be $a_{(p)}^{(2)}$. Then the spatial evolution of the amplitude of the scattered Stokes wave a(s) can be described by the differential equation $$\frac{\partial a_s^{(2)}}{\partial z} = e^{i\Delta q_{pm} z} a_p^{(1)}(z) a_s^{(1)*}(z) a_p^{(2)}(z) \frac{\gamma_B(z)\Gamma/2}{\Omega_B(z) - \Omega - i\Gamma/2}. \quad (20)$$

Here $\gamma_B(z)$ is the nonlinear coupling coefficient and $\Omega_B(z)$ is the phonon resonance frequency, both of which which may vary along the device length, and r is the intrinsic phonon lifetime.

With various choices for $\gamma_B(z)$ and $\Omega_B(z)$ this equation reproduces most of the interesting frequency response characteristics that are experimentally observed. It should be noted that in reality $\Delta q_{pm}$ is likely also position-dependent since the optical group indices will change in response to small variations in waveguide core size.

Note that in the absence of z-dependent inhomogeneities and assuming undepeleted pump fields, Eq. 20 gives the expected sinc-like modulation response as wavevector detuning is changed:

$$a_s^{(2)}(L) = a_p^{(1)} a_s^{(1)*} a_p^{(2)} \frac{\gamma_B \Gamma/2}{\Omega_B - \Omega - i\Gamma/2} \int_0^L e^{i\Delta q_{pm} z} dz \quad (21)$$

$$= a_p^{(1)} a_s^{(1)*} a_p^{(2)} \frac{\gamma_B \Gamma/2}{\Omega_B - \Omega - i\Gamma/2} L e^{i\Delta q_{pm} L/2} \mathrm{sinc}\left(\frac{\Delta q_{pm} L}{2}\right).$$

Then the output modulation signal power is given by $$P_s^{(2)}(L) = \quad (22)$$

$$a_s^{(2)}(L) a_s^{(2)*}(L) = P_p^{(1)} P_s^{(1)} P_p^{(2)} L^2 \frac{|\gamma_B|^2 \Gamma^2/4}{(\Omega_B - \Omega)^2 + \Gamma^2/4} \mathrm{sinc}^2\left(\frac{\Delta q_{pm} L}{2}\right).$$

F. Improving Modulator Bandwidth with Dispersion Engineering

The phase matching bandwidth of the NIBS process is determined by the group velocities of the optical modes, as described in Section IA, and is given by Eq. (7). Specifically, this bandwidth is inversely proportional to the difference in group indexes of the optical modes $\Delta n_g = |n_{g,+} - n_{g,-}|$. Reducing the difference in group indexes will therefore enhance the bandwidth of the nonreciprocal modulator for a device of a given length L.

Furthermore, this enhancement in bandwidth does not affect the nonreciprocal performance, as the frequency splitting between forward and backward phase-matching also scales inversely with $\Delta n_g$ (see section (I)(C)).

The optical dispersion properties of the waveguides are determined by the refractive index profile of the waveguide cross section, and by the waveguide geometry. Therefore, minimizing $\Delta n_g$ can be achieved by modifying the waveguide design and material properties to maximize the phase-matched bandwidth.

As an example, comparison was made between the bandwidth of a device similar to the 15 one measured in this study and an alternative device with a modified waveguide geometry.

FIG. 6a shows the optical waveguide design used for both waveguide cores of the NIBS modulator from the main text, and the two first optical mode profiles as simulated by a finite-element mode solver. This ridge waveguide device has a simulated difference of group indexes $\Delta n_g = 0.11$, in good agreement with measurements. The expected transmission response of this NIBS device in the forward and backward directions is illustrated in FIG. 6b. An alternative, weakly-guiding ridge design is illustrated in FIG. 6c, where the dimensions of the guiding ridge are half of those in (a) and have a 65° angle for the ridge sidewalls. The difference in group indexes of this design is calculated to be $\Delta n_g = 0.01$, a tenfold reduction compared to the current device design. The transmission response of the modified device is illustrated in FIG. 6d, showing a corresponding tenfold increase in bandwidth. Similar results can be achieved by a variety of different design modifications to enable ultra-broad bandwidth nonreciprocal devices in silicon photonic circuits.

II. Coupled Amplitude Equations and Energy Transfer Dynamics

Described in this section are the coupled amplitude equations which describe the spatial evolution of optical and acoustic fields within the optically-driven NIBS modulator. Throughout this discussion, two-waveguide system is assumed, with each waveguide core guiding pump and Stokes waves in two separate optical modes. However, this treatment may be extended to more general systems such as polarization- or spatially-multiplexed optical fiber, or light fields of disparate wavelengths or spatial modes within the same Brillouin-active waveguide core, provided that inter-mode linear and nonlinear crosstalk is negligible.

A. General Coupling Equations Including Nonlinear Loss

Described is the case of on-resonant interaction in the steady state, where it is assumed that phase matching and that all optical frequencies are approximately equal for purposes of energy conservation. In the drive waveguide, were inject two guided optical waves at frequencies $\omega_p^{(1)}$ and $\omega_s^{(1)} = \omega_p^{(1)} - \Omega$ with amplitudes $a_{(p)}^{(1)}$ and $a_{(s)}^{(1)}$. When these waves are 10 coupled through a common phonon field with amplitude b, their coupled-amplitude equations of motion are $$\frac{\partial a_p^{(1)}}{\partial z} = -\frac{G^{(1)}}{2} a_s^{(1)} b - \frac{1}{2}\left(\alpha_p^{(1)} + \beta_{pp}^{(1)}|a_p^{(1)}|^2 + \gamma_{ppp}^{(1)}|a_p^{(1)}|^4\right) a_p^{(1)} - \quad (23)$$

$$\frac{1}{2}\left(2\beta_{ps}^{(1)} + 4\gamma_{pps}^{(1)}|a_p^{(1)}|^2 + \gamma_{pss}^{(1)}|a_s^{(1)}|^2\right)|a_s^{(1)}|^2 a_p^{(1)}$$

$$\frac{\partial a_s^{(1)}}{\partial z} = \frac{G^{(1)}}{2} a_p^{(1)} b^* - \frac{1}{2}\left(\alpha_s^{(1)} + \beta_{ss}^{(1)}|a_s^{(1)}|^2 + \gamma_{sss}^{(1)}|a_s^{(1)}|^4\right) a_s^{(1)} - \quad (24)$$

$$\frac{1}{2}\left(2\beta_{sp}^{(1)} + 4\gamma_{ssp}^{(1)}|a_s^{(1)}|^2 + \gamma_{spp}^{(1)}|a_p^{(1)}|^2\right)|a_p^{(1)}|^2 a_s^{(1)}$$

where it is assumed that the phonon field is spatially heavily damped compared to the distance over which appreciable optical energy transfer occurs. In this case the phonon field follows the spatial evolution of the optical fields and can be written as:

$$b = a_s^{(1)*} a_p^{(1)}. \tag{25}$$

In these equations, $G^{(1)}$ is the real-valued Brillouin coupling coefficient, a is the linear power loss coefficient for mode i, $\beta_{ii}$ and, $\beta_{iij}$ are the intra- and inter-modal nonlinear loss coefficients due to two-photon absorption (TPA). $\gamma_{iii}$ is the intra-modal nonlinear loss coefficient for TPA-induced free carrier absorption (FCA), while $\gamma_{ijj}$ and $\gamma_{iij}$ are the inter-modal FCA loss coefficients. Here i and j are dummy indices which refer to either optical field (mode).

The optical amplitudes are normalized such that $P_p^{(1)}(z) = |a_p^{(1)}|^2$ and $P_s^{(1)}(z) = |a_s^{(1)}|^2$ and the phonon field is normalized such that, $$P_b = \frac{\Omega_B}{\omega_s^{(1)}} \frac{v_{b,g}}{\Gamma_B} G^{(1)} |b|^2$$

where $v_{b,g}$ is the acoustic group velocity and $\Gamma_B$ is the acoustic decay rate.

Equations (1)-(3) describe inter-modal Brillouin coupling in the presence of nonlinear loss for two optical modes guided in the same waveguide coupled though a single phonon field.

Equations of motion are modified and extended to describe the NIBS process by including two additional optical waves guided in a separate waveguide which couple to the same acoustic phonon mode. In general these fields, with amplitudes $a_{(p)}^{(2)}$ and $a_{(s)}^{(2)}$, will be at a distinct set of optical frequencies separated by the phonon frequency $\omega_s^{(2)} = \omega_p^{(2)} - \Omega$. Note that depending on the initial conditions and phase-matching configuration of the system, it is possible to have energy transfer in either direction between these two fields. In general, the motion of these fields is governed by equations structurally identical to Eqs. (1)-(2):

$$\frac{\partial a_p^{(2)}}{\partial z} = -\frac{G^{(2)}}{2} a_s^{(2)} b - \frac{1}{2} \left( \alpha_p^{(2)} + \beta_{pp}^{(2)} |a_p^{(2)}|^2 + \gamma_{ppp}^{(2)} |a_p^{(2)}|^4 \right) a_p^{(2)} - \tag{26}$$
$$\frac{1}{2} \left( 2\beta_{ps}^{(2)} + 4\gamma_{pps}^{(2)} |a_p^{(2)}|^2 + \gamma_{pss}^{(2)} |a_s^{(2)}|^2 \right) |a_s^{(2)}|^2 a_p^{(2)}$$

$$\frac{\partial a_s^{(2)}}{\partial z} = \frac{G^{(2)}}{2} a_p^{(2)} b^* - \frac{1}{2} \left( \alpha_s^{(2)} + \beta_{ss}^{(2)} |a_s^{(2)}|^2 + \gamma_{sss}^{(2)} |a_s^{(2)}|^4 \right) a_s^{(2)} - \tag{27}$$
$$\frac{1}{2} \left( \beta_{sp}^{(2)} + 4\gamma_{spp}^{(2)} |a_s^{(2)}|^2 + \gamma_{spp}^{(2)} |a_p^{(2)}|^2 \right) |a_p^{(2)}|^2 a_s^{(2)}$$

where it is necessary also to modify the phonon field to include driving terms from both waveguides $$b = a_s^{(1)*} a_p^{(1)} + a_s^{(2)*} a_p^{(2)}. \tag{28}$$

Note that this opens the door to the possibility of action on the phonon field by the modulator waveguide. In the case that the amplitude product between the two terms is different in sign, this can lead to destructive interference between the two driving terms (i.e. a steady-state) in the regime of strongly-coupled dynamics.

Depending on geometric asymmetries between drive and modulator waveguides, the linear and nonlinear coefficients can be different between the two waveguides. In this present work, drive and modulator waveguides are almost identical and symmetric, so $G^{(1)} \approx G^{(2)}$, $a_j^{(1)} \approx a_j^{(2)}$, $\beta_{ij}^{(1)} \approx \beta_{ij}^{(2)}$ and $\gamma_{ijk}^{(1)} \approx \gamma_{ijk}^{(2)}$. The potential for inter-core nonlinear loss was also neglected, for example that arising from diffusion of free carriers from one core to the other. Any excess inter-core loss even at the highest tested powers throughout our experiments were not observed, so this seems to be a good approximation.

Together, Eqs. (23-24) and (26-28) describe the general dynamics of the NIBS modulator studied in this work and are used to calculate the theoretical trend in FIG. 10.

B. Approximate Analytic Solution to Coupling Equations

In order to understand the behavior of and ultimate limits to energy transfer through the NIBS process, a closed-form solution to coupling equations of the type of Section IA was sought. The nonlinear loss was neglected, which can be later re-introduced as a modification to a single linear loss parameter $\alpha_s^1 = \alpha_p^1 \equiv \alpha$. The action of the modulator waveguide fields on the phonon amplitude has also been neglected. In this case, the equations of motion for the five field amplitudes are:

$$\frac{\partial a_p^{(1)}}{\partial z} = -\frac{G^{(1)}}{2} a_s^{(1)} b - \frac{1}{2} \alpha^{(1)} a_p^{(1)} \tag{29}$$

$$\frac{\partial a_s^{(1)}}{\partial z} = \frac{G^{(1)}}{2} a_p^{(1)} b^* - \frac{1}{2} \alpha^{(1)} a_s^{(1)} \tag{30}$$

$$\frac{\partial a_p^{(2)}}{\partial z} = -\frac{G^{(2)}}{2} a_s^{(2)} b - \frac{1}{2} \alpha^{(2)} a_p^{(2)} \tag{31}$$

$$\frac{\partial a_p^{(2)}}{\partial z} = \frac{G^{(2)}}{2} a_p^{(2)} b^* - \frac{1}{2} \alpha^{(2)} a_s^{(1)} \tag{32}$$

$$b = a_s^{(1)*} a_p^{(1)}. \tag{33}$$

By substituting Eq. (33) into Eqs. (29)-(30), coupled equations for the two fields in the drive waveguide can be written as $$\frac{\partial a_p^{(1)}}{\partial z} = -\frac{G^{(1)}}{2} |a_s^{(1)}|^2 a_p^{(1)} - \frac{\alpha^{(1)}}{2} a_p^{(1)} \tag{34}$$

$$\frac{\partial a_s^{(1)}}{\partial z} = \frac{G^{(1)}}{2} |a_p^{(1)}|^2 a_s^{(1)} - \frac{\alpha^{(1)}}{2} a_s^{(1)} \tag{35}$$

Since these equations are decoupled from those of the modulator waveguide, the general solution to their dynamics is first sought, this allows to write down the spatial evolution of the phonon field b.

To simplify these equations, change of variables was made such that $a_p^{(1)} = e^{-\alpha^{(1)} z/2} q_p^{(1)}$, $a_s^{(1)} = e^{-\alpha^{(1)} z/2} q_s^{(1)}$. The transformed equations read $$\frac{\partial q_p^{(1)}}{\partial z} = -\frac{G^{(1)}}{2} |q_s^{(1)}|^2 e^{-\alpha^{(1)} z} q_p^{(1)} \tag{36}$$

$$\frac{\partial q_s^{(1)}}{\partial z} = \frac{G^{(1)}}{2} |q_p^{(1)}|^2 e^{-\alpha^{(1)} z} q_s^{(1)} \tag{37}$$

Note that these equations satisfy the conservation relation $$\frac{\partial}{\partial z} (q_p^{(1)*} q_p^{(1)} + q_s^{(1)*} q_s^{(1)}) = 0.$$

As a result, $|q_p^{(1)}|^2 + |q_s^{(1)}|^2$ is a constant equal to the total input power $P_{in}^{(1)}$. This allows one to rewrite Eqs. 14-15 as $$\frac{\partial q_p^{(1)}}{\partial z} = -\frac{G^{(1)}}{2}\left(P_{in}^{(1)} - |q_p^{(1)}|^2\right)e^{-\alpha^{(1)}z}q_p^{(1)}, \quad (38)$$

$$\frac{\partial q_s^{(1)}}{\partial z} = \frac{G^{(1)}}{2}\left(P_{in}^{(1)} - |q_s^{(1)}|^2\right)e^{-\alpha^{(1)}z}q_s^{(1)} \quad (39)$$

It is needed to make one more observation to solve these (now decoupled) equations. Note that, while in general $q_p^{(1)}$ and $q_s^{(1)}$ are complex numbers, their complex phase is unchanged with propagation. In other words, another set of substitutions $r_p^{(1)} = e^{-i\Phi_p^{(2)}}q_p^{(1)}$ and $r_s^{(1)} = e^{-i(\Phi b + \Phi_p^{(2)})}q_s^{(1)}$, can be made, where $r_p^{(1)}$ and $r_s^{(1)}$ are real and $e^{i\Phi_p^{(1)}}$ and $e^{i\Phi_s^{(1)}}$ are the phase factors of the pump and Stokes waves, respectively. The equations governing the propagation of these real variables are $$\frac{\partial r_p^{(1)}}{\partial z} = -\frac{G^{(1)}}{2}\left(P_{in}^{(1)} - (r_p^{(1)})^2\right)e^{-\alpha^{(1)}z}r_p^{(1)} \quad (40)$$

$$\frac{\partial r_s^{(1)}}{\partial z} = \frac{G^{(1)}}{2}\left(P_{in}^{(1)} - (r_s^{(1)})^2\right)e^{-\alpha^{(1)}z}r_s^{(1)} \quad (41)$$

and each is separable with the solutions:

$$r_p^{(1)2}(z) = \frac{P_{in}^{(1)}e^{\frac{G^{(1)}P_{in}^{(1)}}{\alpha^{(1)}}(e^{-\alpha^{(1)}z}-1)}}{k + e^{\frac{G^{(1)}P_{in}^{(1)}}{\alpha^{(1)}}(e^{-\alpha^{(1)}z}-1)}} \quad (42)$$

$$r_s^{(1)2}(z) = \frac{P_{in}^{(1)}k}{k + e^{\frac{G^{(1)}P_{in}^{(1)}}{\alpha^{(1)}}(e^{-\alpha^{(1)}z}-1)}} \quad (43)$$

where $k \equiv P_s^{(1)}(z=0)/P_p^{(1)}(z=0)$ is the ratio of input Stokes to pump powers. Since the exponential terms, k and $P_{in}^{(1)}$ are all positive, it is possible to take the positive roots and transform back to field amplitudes using $a_p^{(1)} = e^{i\Phi_p^{(1)}}e^{-\alpha^{(1)}z/2}r_p^{(1)}$, $a_s^{(1)} = e^{i\Phi_s^{(1)}}e^{-\alpha^{(1)}z/2}r_s^{(1)}$ $$a_p^{(1)}(z) = \frac{e^{i\phi_p^{(1)}}\sqrt{P_{in}^{(1)}}e^{-\alpha^{(1)}z/2}e^{\frac{G^{(1)}P_{in}^{(1)}}{2\alpha^{(1)}}(e^{-\alpha^{(1)}z}-1)}}{\sqrt{k + e^{\frac{G^{(1)}P_{in}^{(1)}}{\alpha^{(1)}}(e^{-\alpha^{(1)}z}-1)}}} \quad (44)$$

$$a_s^{(1)}(z) = \frac{e^{i\phi_s^{(1)}}e^{-\alpha^{(1)}z/2}\sqrt{P_{in}^{(1)}k}}{\sqrt{k + e^{\frac{G^{(1)}P_{in}^{(1)}}{\alpha^{(1)}}(e^{-\alpha^{(1)}z}-1)}}} \quad (45)$$

The resulting driven phonon amplitude is $$b(z) = a_s^{(1)*}(z)a_p^{(1)}(z) = \quad (46)$$

$$\frac{e^{i(\phi_p^{(1)}-\phi_s^{(1)})}e^{-\alpha^{(1)}z}P_{in}^{(1)}\sqrt{k}e^{\frac{G^{(1)}P_{in}^{(1)}}{2\alpha^{(1)}}(e^{\alpha^{(1)}z}-1)}}{k + e^{\frac{G^{(1)}P_{in}^{(1)}}{\alpha^{(1)}}(e^{\alpha^{(1)}z}-1)}} \equiv e^{i\phi_b}|b(z)|$$

Here, also re-written is the complex phonon amplitude as consisting of a complex phase $e^{i\phi_b} = e^{i(\phi_p^{1}-\phi_s^{1})}$ and a real amplitude, $|b(z)|$.

Returning now to the Eqs. (9)-(10) for the modulator-waveguide optical field amplitudes and make the change of variables $a_p^{(2)} = e^{-\alpha^{(2)}z/2}q_p^{(2)}$, $a_s^{(2)} = e^{-\alpha^{(2)}z/2}q_s^{(2)}$ to eliminate the optical loss term:

$$\frac{\partial q_p^{(2)}}{\partial z} = -\frac{G^{(2)}}{2}q_s^{(2)}b = -\frac{G^{(2)}}{2}q_s^{(2)}e^{i\phi_b}|b(z)| \quad (47)$$

$$\frac{\partial q_s^{(2)}}{\partial z} = \frac{G^{(2)}}{2}q_p^{(2)}b^* = \frac{G^{(2)}}{2}q_p^{(2)}e^{-i\phi_b}|b(z)| \quad (48)$$

As before, it was sought to transform these differential equations in complex variables to a set of purely real variables. The substitutions $r_p^{(2)} = e^{-i\Phi_p^{(2)}}q_p^{(2)}$ and $r_s^{(2)} = e^{-i(\Phi b + \Phi_p^{(2)})}q_s^{(2)}$ were used, where $e^{i\phi_p^{(2)}}$ is the input phase of the pump wave in the modulator waveguide. This transformation eliminates the complex phase of the phonon field to yield the coupled equations $$\frac{\partial r_p^{(2)}}{\partial z} = -\frac{G^{(2)}}{2}r_s^{(2)}|b(z)| \quad (49)$$

$$\frac{\partial r_s^{(2)}}{\partial z} = \frac{G^{(2)}}{2}r_p^{(2)}|b(z)| \quad (50)$$

Note that while even if it is assumed here that an arbitrary phase factor $e^{i\phi_p^{(2)}}$ for the pump wave, this degree of freedom is not for the scattered Stokes wave. If there is an incident Stokes light that is out-of-phase with the scattered Stokes light (at phase $\phi_b + \phi_p^{(2)}$), then the dynamics of this problem become more complex and cannot easily be uncoupled. Here it is assumed that there is no incident Stokes light, as in the case of typical operation. Then it is possible to take $r_p^{(2)}$ to be real since an arbitrary phase si already factored out, and hence $r_s^{(2)}$ will also be real.

These equations then satisfy the conservation $$\frac{\partial}{\partial z}\left((r_p^{(2)})^2 + (r_s^{(2)})^2\right) = 0,$$

relation, so it can be written that $(r_p^{(2)})^2 + (r_s^{(2)})^2 = P_{in}^{(2)}$, where $P_{in}^{(2)}$ is the total incident power in the drive waveguide and is assumed to be incident entirely in the pump wave, i.e. The equation governing the spatial evolution of the Stokes wave becomes $$\frac{\partial r_s^{(2)}}{\partial z} = \frac{G^{(2)}}{2}\sqrt{P_{in}^{(2)} - (r_s^{(2)})^2}|b(z)| \quad (51)$$

This equation is again separable as:

$$\frac{\partial r_s^{(2)}}{\sqrt{P_{in}^{(2)} - (r_s^{(2)})^2}} = \frac{G^{(2)}}{2}|b(z)|\partial z \quad (52)$$

In other words, for any NIBS modulation process, provided that it is possible to integrate the driven phonon field over space, one can find an expression for the Stokes signal power. Here this equation becomes $$\int \frac{\partial r_s^{(2)}}{\sqrt{P_{in}^{(2)} - (r_s^{(2)})^2}} = \int \frac{G^{(2)} e^{-\alpha^{(1)} z} P_{in}^{(1)} \sqrt{k} e^{\frac{G^{(1)} P_{in}^{(1)}}{2\alpha^{(1)}} (e^{-\alpha^{(1)} z} - 1)}}{k + e^{\frac{G^{(1)} P_{in}^{(1)}}{\alpha^{(1)}} (e^{-\alpha^{(1)} z} - 1)}} \quad (53)$$

The righthand side is integrable with the substitution $u = e^{\alpha^{(1)} z}$ $$\tan^{-1}\left(\frac{r_s^{(2)}}{\sqrt{P_{in}^{(2)} - (r_s^{(2)})^2}}\right) = \frac{G^{(2)}}{G^{(1)}}\left(\left(\tan^{-1}\frac{1}{\sqrt{k}}\right) - \tan^{-1}\left(\frac{e^{\frac{G^{(1)}}{2\alpha_1}(e^{-\alpha^{(1)} z} - 1)}}{\sqrt{k}}\right)\right) \quad (54)$$

which simplifies to $$r_s^{(2)} = \sqrt{P_{in}^{(2)}} \sin\left(\frac{G^{(2)}}{G^{(1)}}\left(\tan^{-1}\left(\frac{1}{\sqrt{k}}\right) - \tan^{-1}\left(\frac{e^{\frac{G^{(1)} P_{in}^{(11)}}{2\alpha_1}(e^{-\alpha^{(1)} z} - 1)}}{\sqrt{k}}\right)\right)\right) \quad (55)$$

Substituting back, the complex amplitude can be found using $$a_s^{(2)} = e^{i(\phi_p^{(1)} - \phi_n^{(1)} + \phi_p^{(2)})} e^{-\alpha^{(2)} z/2} r_s^{(2)} \quad (56)$$

$$a_s^{(2)} = \sqrt{P_{in}^{(2)}} e^{i(\phi_p^{(1)} - \phi_n^{(1)} + \phi_p^{(2)})} e^{-\alpha^{(2)} s/2}$$
$$\sin\left(\frac{G^{(2)}}{G^{(1)}}\left(\tan^{-1}\left(\frac{1}{\sqrt{k}}\right) - \tan^{-1}\left(\frac{e^{\frac{G^{(1)} P_{in}^{(11)}}{2\alpha_1}(e^{-\alpha^{(1)} z} - 1)}}{\sqrt{k}}\right)\right)\right)$$

This equation describes the spatial evolution of the scattered Stokes amplitude in the modulator waveguide as a function of the other three incident fields, the Brillouin couplings in each waveguide, and propagation losses. The total modulation efficiency $\eta^2$ is defined as the output scattered light power relative to the incident power in the modulator waveguide:

$$\eta^2 \equiv \frac{P_s^{(2)}(L)}{P_{in}^{(2)}} = \frac{a_s^{(2)*}(L) a_s^{(2)}(L)}{P_{in}^{(2)}} = \quad (57)$$
$$e^{-\alpha^{(2)} 2} \sin^2\left(\frac{G^{(2)}}{G^{(1)}}\left(\tan^{-1}\left(\frac{1}{\sqrt{k}}\right) - \tan^{-1}\left(\frac{e^{\frac{G^{(1)} P_{in}^{(1)}}{2\alpha_1}(e^{-\alpha^{(1)} z} - 1)}}{\sqrt{k}}\right)\right)\right)$$

where $z = L$ is taken to be the total device length. For maximum efficiency to occur, the expression inside the sine-squared term should be equal to $\pi/2$.

For given values of $G^{(1)}$ and $P_{in}^{(1)}$, (i.e. given a device design and power budget), this expression is maximized when $$k = e^{\frac{G^{(1)} P_{in}^{(1)}}{2\alpha^{(1)}}(e^{-\alpha^{(1)} L} - 1)} \quad (58)$$

In other words, there is an optimal way to bias the relative powers of the two waves in the 10 drive waveguide. Given this optimal power biasing, the minimum pump power to reach unity efficiency (complete power conversion, neglecting linear insertion loss, in the modulator waveguide) is:

$$P_{in}^{(1)} = \frac{2\alpha^{(1)}}{G^{(1)}(e^{-\alpha^{(1)} L} - 1)} \log\left(\tan^2\left(\frac{\pi}{4}\left(1 - \frac{G^{(1)}}{G^{(2)}}\right)\right)\right) \quad (59)$$

1. Special Case: $G^{(1)} = G^{(2)}$

In symmetrical systems, the Brillouin coupling coefficients for each process are nearly identical. This is the case for the NIBS modulator device studied here where the drive and modulator waveguide core sizes and wavelengths are different by less than 2%. In this situation, the equations governing conversion efficiency simplify dramatically.

In the case where $G^{(1)} = G^{(2)} \equiv (G)$, Eq. (57) becomes $$\eta^2 = e^{-\alpha^{(2)} L} \frac{k}{k+1} \frac{\left(e^{\frac{GP_{in}^{(1)}}{2\alpha^{(1)}}(1 - e^{-\alpha^{(1)} L})} - 1\right)^2}{\left(ke^{\frac{GP_{in}^{(1)}}{\alpha^{(1)}}(1 - e^{-\alpha^{(1)} L})} + 1\right)^2} \quad (60)$$

An absolute upper bound on energy transfer is defined by the relative ratio of input pump to Stokes powers in the modulator waveguide.

$$\lim_{GP_{in}^{(1)} \to \infty} \eta^2 = e^{-\alpha^{(2)} L} \frac{1}{k+1} \quad (61)$$

In other words, the fraction of power transfer in the modulator waveguide is bounded by the fraction of power transfer in the drive waveguide. This limit results from pump depletion, and hence phonon field attenuation, in this waveguide.

In most realistic systems, there is a practical upper limit on optical power, Brillouin coupling, and device length. In a system where these are fixed, the maximum energy transfer is achieved when the input power ratio k satisfies Eq. (58). When this is the case, the maximum efficiency is given by:

$$\eta_{max}^2 = e^{-\alpha^{(2)} L} \tanh^2\left(\frac{GP_{in}^{(1)}(1 - e^{-\alpha^{(1)} L})}{4\alpha^{(1)}}\right) \quad (62)$$

If insertion losses are small $\alpha_1 L \ll 1$ then this expression simplifies further $$\eta_{max}^2 = e^{-\alpha^{(2)} L} \tanh^2\left(\frac{GP_{in}^{(1)} L}{4}\right) \quad (63)$$

C. Externally Driven Phonon Field

Expressions were derived for energy transfer efficiency given optical pumping of the acoustic phonon mode with injection only at the device input. In order to achieve maximum energy transfer in a small footprint, other acoustic driving schemes may be preferable, e.g. re-injection of pump light along device length, or electromechanical driving of the phonon mode. The case of an arbitrary phonon amplitude profile was briefly considered.

From Eq. (52), it is possible to derive an analogous result to Eq. (57) for an arbitrary phonon field:

$$\eta^2 \equiv \frac{P_s^{(2)}(L)}{P_{in}^{(2)}} = e^{-\alpha^{(2)}L}\sin^2\left(\int_0^L \frac{G^{(2)}|b(z)|dz}{2}\right) \quad (64)$$

If a phonon field $b(z)=b_0$ whose amplitude is constant in space, this expression becomes:

$$\eta^2 = e^{-\alpha^{(2)}L}\sin^2\left(\frac{G^{(2)}b_0 L}{2}\right) \quad (65)$$

This efficiency is maximized when $G^{(2)}b_0 L=\pi$. Since for an optically-driven acoustic $b_0 \propto \sqrt{P_p^{(1)}P_s^{(1)}}$ wave this sets a minimum bound on the optical power necessary to achieve unity modulation efficiency in terms of the total incident power $P_{in}^{(1)}$; assuming $P_p^{(1)}=P_s^{(1)}=P_{in}^{(1)}/2$, which locally maximizes the driven phonon amplitude, then $G^{(2)}P_{in}^{(1)}L>2\pi$. To practically achieve comparable performance with such gain-power-length products, schemes for re-injection of depleted pump light are necessary. Without such techniques, Eq. (63) gives a condition $G^{(2)}P_{in}^{(1)}L=12$ for 99% modulation efficiency in a linear device.

One can calculate the corresponding acoustic power necessary for unity efficiency by invoking the normalization condition $$P_b = \frac{\Omega_B}{\omega_s}\frac{v_{b,g}}{\Gamma_B}G|b_0|^2$$

where assumption is that a single Brillouin coupling coefficient G and single optical Stokes frequency $\omega_s$. Then the power required for complete energy transfer from pump to Stokes waves is:

$$P_b = \frac{\Omega_B}{\omega_s}\frac{v_{b,g}}{\Gamma_B}\frac{\pi^2}{GL^2} \quad (66)$$

which can also be expressed in terms of the distributed optomechanical coupling strength $g_o$ as:

$$P_b = \hbar\Omega_B \frac{v_{b,g}v_s v_p}{4|g_0|^2}\frac{\pi^2}{L^2} \quad (67)$$

where $v_s$ and $v_p$ are the optical group velocities of the pump and Stokes waves. For a Brillouin-active silicon waveguide with identical parameters to those studied here, this threshold acoustic power is:

$$P_b = \frac{2\pi\,5.7\text{ GHz}}{2\pi\,194\text{ THz}}\cdot\frac{826\text{ ms}^{-1}}{2\pi\,17\text{ MHz}}\cdot\frac{\pi^2}{(0.024\text{ m})^2}\cdot\frac{1}{198W^{-1}m^{-1}} = 20nW. \quad (68)$$

III. Scattering Matrix Formulation

In this section, a phenomenological model that captures the behavior of the nonreciprocal modulation produced by nonlocal inter-band Brillouin scattering is presented. This scattering matrix model may also be used to explore the properties of cascaded nonreciprocal circuits.

Begin by representing each of the four ports of the NIBS modulator diagrammed in FIG. 7 as an element of a column vector A. Light at a single port i is represented as:

$$A_i = \begin{pmatrix}\delta_{1i}\\\delta_{2i}\\\delta_{3i}\\\delta_{4i}\end{pmatrix}. \quad (69)$$

the total power amplitude is normalized to a value of 1. Assuming idealized mode converters (i.e. neglect cross-talk) and write the scattering matrix that represents the effect of the NIBS modulator on an input signal as:

$$A_{out}=B\cdot A_{in}, \quad (70)$$

where $A_{in}$ and $A_{out}$ are four-element vectors that represent the respective input and output fields, and B is defined by $$B = \begin{pmatrix} 0 & 0 & \sqrt{1-\eta_f^2} & \eta_b e^{\pm i(\phi_b+\Omega t)} \\ 0 & 0 & \eta_b e^{\pm i(\phi_b+\Omega t)} & \sqrt{1-\eta_f^2} \\ \sqrt{1-\eta_f^2} & \eta_f e^{\mp i(\phi_f+\Omega t)} & 0 & 0 \\ \eta_f e^{\mp i(\phi_f+\Omega t)} & \sqrt{1-\eta_f^2} & 0 & 0 \end{pmatrix} \quad (71)$$

Here, $\eta_f^2$ and $\eta_b^2$ are the inter-band power conversion efficiencies in the forward and backward directions, respectively. $\phi_f$ and $\phi_b$ are the corresponding phase-shifts associated with the inter-band scattering, and Q is the frequency shift imparted by the driven acoustic field. The upper or lower of $\pm$ and $\mp$ represents the case of a forward- or backward-propagating acoustic field, respectively. The antidiagonal terms represent inter-band scattering through Stokes or anti-Stokes processes. When this matrix is asymmetric $\eta_f \neq \eta_b$, it represents a nonreciprocal mode conversion process.

It is assumed that $\eta_f^2 \gg \eta_b^2 \approx 0$, i.e. that the device is operating around an optical wavelength $\omega_f$ where strong nonreciprocity is supported in the forward direction. (This same model can be used for strong backward-propagating modulation by considering the case where $\eta_b^2 \gg \eta_f^2 \approx 0$). This scattering matrix is represented diagrammatically for four different input cases in FIG. 7. The input and output amplitudes at each port are labeled with their corresponding efficiencies, and in the forward-propagating case strong mode conversion is observed.

In the case of perfect inter-band conversion where $\eta_f^2 \approx 1$, the idealized scattering matrix becomes:

$$B_{\eta_f^2=1} = \begin{pmatrix} 0 & 0 & 1 & 0 \\ 0 & 0 & 0 & 1 \\ 0 & e^{\pm i(\phi_f+\Omega t)} & 0 & 0 \\ e^{\pm i(\phi_f+\Omega t)} & 0 & 0 & 0 \end{pmatrix} \quad (72)$$

In this form, the nonreciprocal mode conversion is visible as the antidiagonal terms which are only present in the first two columns. This scattering matrix also represents a frequency-shifting four-port circulator; light incident in port 1 exits through port 4, port 4 maps light to port 2, port 2 maps light to port 3, and port 3 maps light back to port 1. This can be seen through the following scattering matrix equations:

$$B_{\eta_f^2=1} \cdot A_1 = e^{\pm i(\phi_f + \Omega t)} A_1 \quad (73)$$

$$B_{\eta_f^2=1} \cdot A_4 = A_2 \quad (74)$$

$$B_{\eta_f^2=1} \cdot A_2 = e^{\mp i(\phi_f + \Omega t)} A_3 \quad (75)$$

$$B_{\eta_f^2=1} \cdot A_3 = A_1 \quad (76)$$

This scattering matrix formulation can be also be used to consider cascaded arrays of NIBS modulator devices. To consider this case, introduced herein is an auxiliary matrix $T_{ij}$ defined by $$T_{ij} = \begin{pmatrix} \delta_{1i}\delta_{1j} & \delta_{1i}\delta_{2j} & \delta_{1i}\delta_{3j} & \delta_{1i}\delta_{4j} \\ \delta_{2i}\delta_{1j} & \delta_{2i}\delta_{2j} & \delta_{2i}\delta_{3j} & \delta_{2i}\delta_{4j} \\ \delta_{3i}\delta_{1j} & \delta_{3i}\delta_{2j} & \delta_{3i}\delta_{3j} & \delta_{3i}\delta_{4j} \\ \delta_{4i}\delta_{1j} & \delta_{4i}\delta_{2j} & \delta_{4i}\delta_{3j} & \delta_{4i}\delta_{4j} \end{pmatrix} \quad (77)$$

In a series of two cascaded devices, $T_{ij}$ can be used to represent connecting port i of the first device to port j of the second device. A repeated index, i.e. $T_{ii}$ can be used to represent back-reflecting light at port i.

Figure 7A:
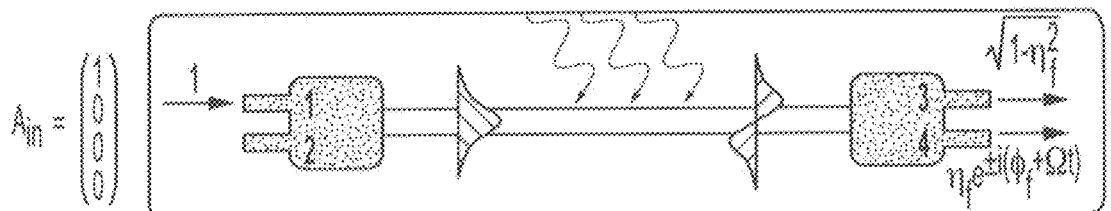
FIGS. 7a-7d depict input and output wave amplitudes for four different configurations corresponding to injecting light in each port of the four-port NIBS modulator.
Figure 7B:
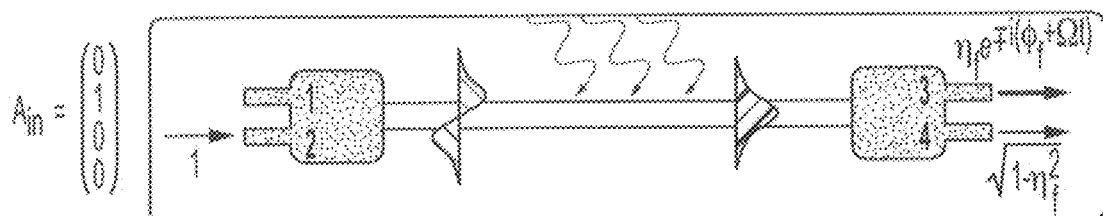
Figure 7C:
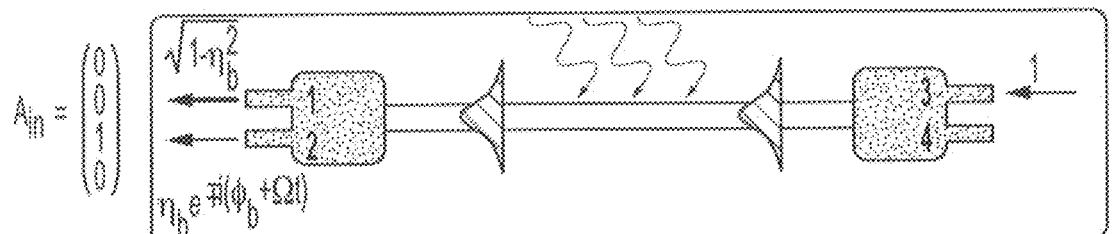
Figure 7D:
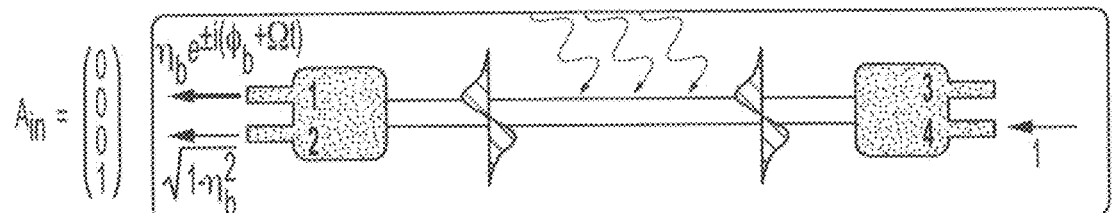
Figure 7E:
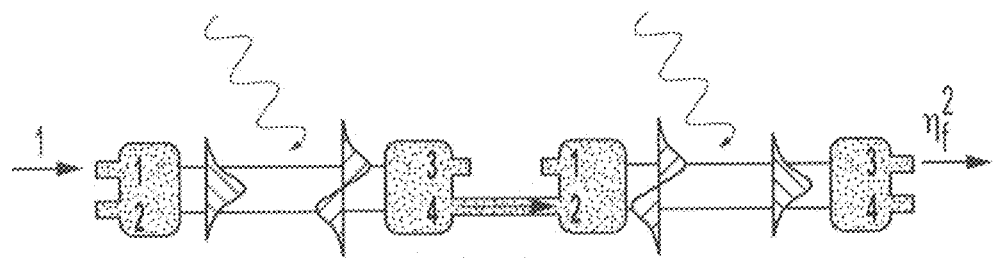
FIG. 7e depicts one approach to create a frequency-neutral isolator by cascading two NIBS modulators.

A simple model for a frequency-neutral (non frequency-shifting) isolator consisting of two NIBS modulators diagrammed in FIG. 7e, with port 4 of the first modulator connected to port 2 of the second is considered. In the forward direction, light incident in port 1 is mode-converted through a Stokes process in the first modulator, then converted back to the fundamental mode through an anti-Stokes process in the second modulator. The resulting transmission is:

$$A_f = B \cdot T_{42} \cdot B \cdot A_1 = \begin{pmatrix} 0 \\ 0 \\ \eta_f^2 \\ \eta_f \sqrt{1-\eta_f^2} \, e^{\pm i(\phi_f + \Omega t)} \end{pmatrix} \quad (78)$$

By contrast, light incident in the backward direction through port 3 of the second modulator does not experience strong mode conversion when $\eta_b \ll 1$. The resulting transmission in the backward direction is $$A_b = B \cdot T_{24} \cdot B \cdot A_3 = \begin{pmatrix} \eta_b^2 \\ \eta_b \sqrt{1-\eta_b^2} \, e^{\mp i(\phi_b + \Omega t)} \\ 0 \\ 0 \end{pmatrix} \quad (79)$$

The corresponding nonreciprocal power transmission between forward and backward directions is $T_{nr} \equiv P_{1 \to 3}/P_{3 \to 1} = \eta_f^4/\eta_b^2$. The effective forward insertion loss is $\eta_f^4$.

IV. Tunability of Operation Wavelength

The optically-driven acoustic phonon used to mediate the NIBS process has a wavevector set directly by the difference in wavevectors between the optical drive tones (Section ID). This phonon then modulates light in a separate waveguide at wavelengths where two optical modes exist with the same wavevector difference. In the present work, the pump wavelength was fixed at $\lambda = 1550$ nm to produce modulation over a 1 nm bandwidth around the probe wavelength ($\lambda_b$ or $\lambda_f$ depending on the direction of injected light).

Figure 8:
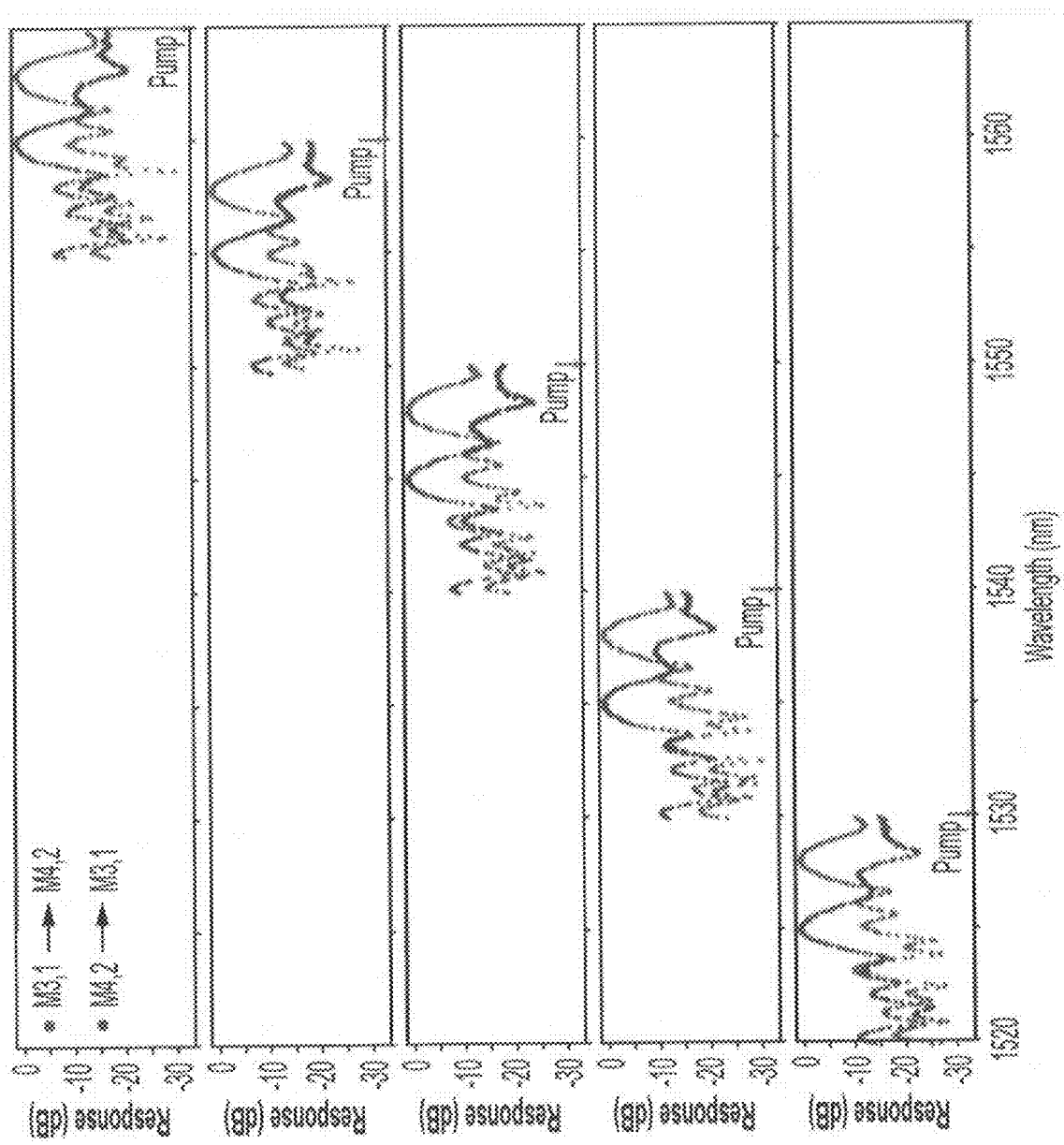
FIG. 8 illustrates graphs of tunability of the NIBS modulator wavelength response as the pump (drive waveguide)

By changing the pump wavelength, the phonon wavevector (and hence probe wavelength) can be directly tuned. This is demonstrated by adjusting our pump wavelength from $\lambda_p = 1530$ nm to $\lambda_p = 1565$ nm to translate the phase-matched modulation wavelength over a similar 35 nm range. As plotted in FIG. 8, as the pump wavelength is tuned, the center modulation wavelength changes by a corresponding amount, with little deviation in the overall shape of the modulation response. This tuning range was limited only by that of the pump laser.

V. Anti-Stokes Modulation Data

In the present work we have presented mode conversion through Stokes scattering processes. If desired, all of the same physics can be applied to produce single-sideband modulation through an anti-Stokes (blue-shifting) scattering process. Because NIBS mediates mode conversion between a pair of optical modes, as described in Section III, this is achieved by injecting light into the opposite mode as would have been used for a Stokes process, as plotted in FIG. 9a. The energy level diagram for this process, a form of nonlocal coherent anti-Stokes Brillouin scattering, is plotted in FIG. 9b.

Forward and backward modulation response data for the anti-Stokes process in a NIBS modulator device are plotted in FIG. 9c. These data show the same behavior as for Stokes modulation in the same device. (FIG. 9e). However, the output light is blue-shifted through this process, with the output spectrum plotted in FIG. 9d. In general, the modulation response and wavelength-dependence of phase-matching for the anti-Stokes process are identical to that of the Stokes processes studied in the paper. Hence in situations where this process is desired, the same operation principles may be applied.

VI. Experimental Modulation Efficiency

In this section, explored is the dependence of the experimental modulation efficiency $\eta^2 = P_s^2(L)/P_p^2(0)$ on the incident drive-waveguide pump powers, $P_p^1$ and $P_s^1$, which are guided in the symmetric and antisymmetric waveguide modes, respectively. Throughout these measurements the relative input ratio of these powers is $P_s^1(0) = 0.65 P_p^1(0)$, i.e. k=0.65.

The numerical curve agrees well with the experimental data with a Brillouin gain coefficient in each waveguide of $G = G(1) = G(2) = 195 \pm 10$ W$^{-1}$ m$^{-1}$. The remaining parameters used in these calculations, which are corroborated by independent waveguide measurements, are summarized in Table 1 below. Of these parameters, L is determined through 5 fabrication, two-photon absorption coefficients and acoustic group and phase velocities ($v_{b,g}$ and $v_{b,p}$) are determined through finite element simulations, and all other quantities are determined from experimental measurements.

TABLE I

Measured and Calculated Device Parameters

| | value |
|---|---|
| Linear optical parameter | |
| L | 2.387 cm |
| $\alpha_+^{(1,2)}$ | 4.6 m$^{-1}$ |
| $\alpha_-^{(1,2)}$ | 9.2 m$^{-1}$ |

TABLE I-continued

Measured and Calculated Device Parameters

| | value |
|---|---|
| Nonlinear optical parameter | |
| Brillouin Gain G | 195 $W^{-1}m^{-1}$ |
| TPA coefficients | |
| $\beta_{++}^{(1,2)}$ | 34 ± 10 $m^{-1}W^{-1}$ |
| $\beta_{--}^{(1,2)}$ | 30 ± 9 $m^{-1}W^{-1}$ |
| $\beta_{+-}^{(1,2)} = \beta^{21}$ | 20 ± 6 $m^{-1}W^{-1}$ |
| FCA coefficients | |
| $\gamma_{+++}^{(1,2)}$ | 1000 ± 400 $m^{-1}W^{-2}$ |
| $\gamma_{---}^{(1,2)}$ | 790 ± 430 $m^{-1}W^{-2}$ |
| $\gamma_{+--}^{(1,2)} = \gamma_{-++}^{122}$ | 340 ± 200 $m^{-1}W^{-2}$ |
| Acoustic parameters | |
| $\Omega_B$ | $2\pi$ 5.70 GHz |
| $\Gamma$ | $2\pi$ 17.0 MHz |
| $Q = \Omega_B/\Gamma$ | 335 |
| q | 4.5 × 10$^5$ $m^{-1}$ |
| $v_{b,g}$ | 826 m/s |
| $v_{b,p}$ | 8.4 × 10$^4$ m/s |

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the devices of the present invention and practice the claimed methods. The following working examples therefore and are not to be construed as limiting in any way the remainder of the disclosure. Demonstrated herein is a device that harnesses optically-driven acoustic waves to produce unidirectional optical modulation and mode conversion over nm-bandwidths. This nonreciprocal operation, realized in a low-loss integrated silicon waveguide, utilizes a nonlocal inter-band Brillouin scattering (NIBS) process in which an optically-driven traveling-wave acoustic phonon time-modulates light guided in a spatially separate optical waveguide. This process is used to produce nonreciprocal modulation with up to 38 dB of contrast between forward- and backward-propagating waves. The resulting output spectrum is single-sideband frequency-shifted with 37 dB relative suppression of spurious tones. In contrast to conventional Brillouin-based signal processing techniques, the bandwidth of this modulation process is controlled through optical-phase matching, rather than limited to the lifetimes of resonant optical or acoustic modes; this permits operating bandwidths that are two orders of magnitude greater than state-of-the-art optomechanical modulators, and four orders of magnitude greater than the device's intrinsic acoustic response. Furthermore, by varying the wavelength of the optical pump, and hence the wavevector of the acoustic drive, this process can be tuned over a range of 35 nm using the same device. This traveling-wave nonreciprocal modulator bridges the gap between current schemes for broadband electro-optic non-reciprocity and low-loss optomechanical modulation, representing a significant step toward the creation of broadband, high-performance integrated isolators and circulators.

The materials and methods used are now described. The origin of the nonreciprocal modulation response in this system can be understood from the distinct phase matching requirements for inter-band scattering in the forward and backward directions. Illustrated here are the requirements to explore the response of this system and determine the requirements for wide-band nonreciprocal operation.

The silicon optomechanical modulator is interfaced with integrated mode multiplexers to separately address the guided optical modes of the optical ridge waveguides. A representation of the mode multiplexing process is diagrammed in FIG. 2a; light incident in port 1 of a mode multiplexer is coupled into the symmetric optical mode, whereas light incident in port 2 is coupled into the antisymmetric optical mode. This process can be operated in reverse to de-multiplex these optical waves into single-mode bus waveguides. The drive and modulator waveguides are each interfaced with two multiplexers (labeled M1-M4 in FIG. 2c) to separately (de)multiplex these two optical modes.

The travelling elastic wave (group velocity $v_{g,b}$~800 m/s) which mediates inter-band coupling is optically-driven through the phonon generation process diagrammed in FIG. 2c. Light at frequency $\omega_p^{(1)}$ is incident in port 1 of M1, and red-detuned light at $\omega_s^{(1)}$ is incident in port 2. These waves propagate through the active region of the drive waveguide to transduce a coherent acoustic phonon with the dispersion relation depicted in FIG. 1b. In this configuration, the optical fields drive a forward-moving phonon with frequency and wavevector $(\Omega, q(\Omega))$. This phonon satisfies both energy conservation $(\Omega=\omega_p^{(1)}-\omega_s^{(1)})$ and phase-matching $(q(\Omega)=k_+^{(1)}(\omega_p^{(1)})-k_-^{(1)})(\omega_p^{(1)}-\Omega))$ for a SIMS process, as represented diagrammatically in FIG. 1d; here $k_+^{(1)}$ and $k_-^{(1)}$ are the dispersion relations for the symmetric and antisymmetric optical 20 modes in the drive waveguide, respectively. In this representation, the phonon (green) maps light between initial (open circle) and final (closed circle) states on separate optical dispersion bands.

This driven phonon may then mediate an inter-band transition through NIBS in a spatially separate modulator waveguide, as diagrammed in FIG. 2d-e. In this process, light at frequency $\omega_p^{(2)}$ incident in port 1 of M3 is mode-converted and red-shifted to $\omega_s^{(2)}$ through a linear acousto-optic scattering process. After passing through the active waveguide region, this light exits the device through port 2 of M4, while any residual un-shifted light remains in the symmetric mode and exits the device through port 1 of M4. As in the drive waveguide, this Stokes scattering process must satisfy energy conservation process must satisfy energy conservation $(\omega_p^{(2)}-\omega_s^{(2)}=\Omega)$ and phase-matching $k_+^{(2)}(\omega_p^{(2)})-k_-^{(2)})(\omega_p^{(2)}-\Omega))k_+^2=q(\Omega))$, as shown in the right side of FIG. 2g, where $k_+^{(2)}$ and $k_-^{(2)}$ are the modulator-waveguide dispersion relations for the symmetric and anti-symmetric optical modes. Note, however, that since the drive and modulator waveguides are not necessarily identical (with a width asymmetry 6 as depicted in FIG. 1b), the optical dispersion relations and frequencies involved in this process may be very different from those used in the phonon generation process. This traveling-wave phonon breaks the symmetry between forward and backward light propagation in the modulator waveguide when it only phase-matches to an inter-band transition in one direction. This symmetry-breaking, diagrammed in FIG. 2g, can be seen as resulting from the non-zero group velocities of the traveling optical waves. For a scattering process that is phase-matched in the forward direction, $$k_+^2(\omega_p^{(2)}) - k_-^2(\omega_p^{(2)} - \Omega) = q(\Omega). \quad (1.1)$$

However, for light is injected in the backward direction, phase matching dictates that $$k_+^2(\omega_p^{(2)}) - k_-^2(\omega_p^{(2)}) = q(\Omega) - \Delta q_{nr} \quad (1.2)$$

Here, $\Delta q_{nr} L$ is the optical phase mismatch accumulation in the backward direction after propagating through a device of length L. We can calculate the nonreciprocal wavevector mismatch by subtracting the phase-matching conditions for forward and backward Stokes processes to find $$\Delta q_{nr} \approx \Omega(n_{g,+}^{(2)} + n_{g,-}^{(2)}) \quad (1.3)$$

where $n_{g,+}^{(2)}$ and $n_{g,-}^{(2)}$ are the optical group velocities of the two modes around $\omega_p^{(2)}$ (see section (I)(B)). Provided that $\Delta q_{nr} \gg 1$, the inter-band scattering process will only be phase-matched in one propagation direction. In this case, NIBS produces unidirectional mode conversion between the two guided modes represented by an asymmetric scattering matrix (see section (III) and FIG. 7).

The bandwidth of device operation is directly set by the difference in group velocities between optical modes. In comparison to fiber systems where polarization multiplexing has been explored, distinct optical modes in integrated waveguides typically have significantly different optical group velocities (i.e. their dispersion bands are not parallel). As a result, as the frequency of optical probe light is changed from the center value for phase matching, the inter-band scattering process experiences a dispersive wavevector mismatch $$\Delta q_{pm} \approx \frac{n_{g,-}^{(2)} - n_{g,+}^{(2)}}{c} \Delta \omega \quad (1.4)$$

where $\Delta \omega$ is the frequency difference between the experimental probe frequency $\omega_p^{(2)}$ and the frequency for which phase-matching is perfectly satisfied. This results in a full-width at half-maximum operating bandwidth defined by $$\frac{\Delta q_{pm} L}{2} = 1.39$$

Figure 2I:
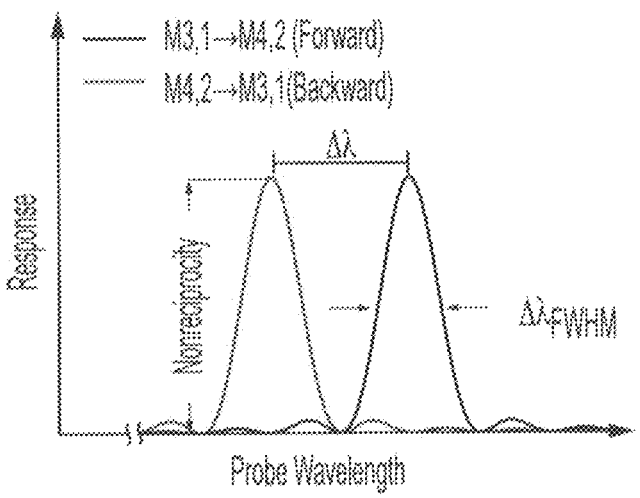

(see section (I)(A)). Interestingly, $\Delta q_{pm}$ may exactly cancel the wavevector mismatch between forward/backward propagation $\Delta q_{nr}$, as diagrammed in FIG. 2h, resulting in efficient modulation in the backward propagation direction. While phase-matching in the forward direction may be achieved at a frequency $\omega_p^{(2)} = \omega_f$, optical dispersion permits phase-matching in the backward direction at $\omega_{(p)}^{(2)} = \omega_b$. The resulting two-way optical transmission spectrum between port 1 of M3 and port 2 of M4 is illustrated in FIG. 2i; each direction experiences a sinc-squared modulation response with center frequencies 10 determined through the optical dispersion relations. Significant non-reciprocity occurs when the peak of transmission in one direction coincides with no transmission in the opposite propagation direction.

Experimental Characterization of Nonreciprocal Response

Figure 3A:
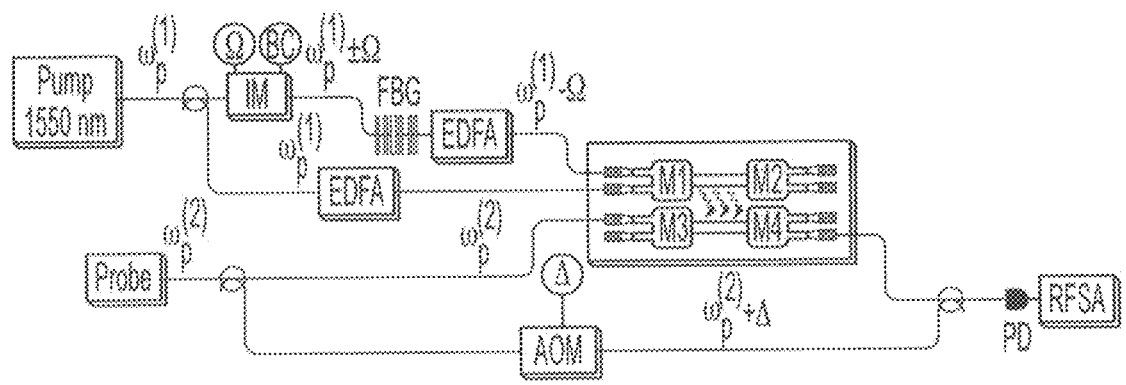
FIG. 3a depicts an experimental setup for measurement of the modulation response. Optical tones at frequencies $\omega_P^{(1)}$ and $\omega_P^{(1)}-\Omega$ are synthesized from the same pump laser in the upper path and incident in separate modes of the drive waveguide. A probe laser at frequency $\omega_P^{(1)}+\Delta$ is split into two paths; in the upper arm, light is coupled into the modulator waveguide in either mode or propagation direction depending on the port is connected to. After propagating through the modulator waveguide, probe light is coupled off-chip and combined with a frequency-shifted local oscillator (lower arm) at frequency $\omega_P^{(2)}+\Delta$ for heterodyne spectral analysis.

The silicon waveguide nonreciprocal modulator is experimentally characterized using the apparatus diagrammed in FIG. 3a. Two strong pump waves at frequencies $\omega_{(p)}^{(1)}$ and $\omega_{(p)}^{(1)} - \Omega$) are synthesized from the same laser operating around 1550 nm. Light at $\omega_{(p)}^{(1)}$ is split into two paths—one is amplified through an erbium-doped fiber amplifier and coupled into the symmetric mode of the drive waveguide. In the other path, a strong tone at $\omega_{(p)}^{(1)}$) is synthesized using a null-biased intensity modulator, and narrowband fiber Bragg grating notch filter. The value of Q is controlled using a microwave frequency synthesizer. This wave is amplified and coupled into the antisymmetric mode of the drive waveguide. Probe light at frequency $w_{(p)}^{(2)}$ is generated from a separate tunable probe laser. This light is split into two paths-the first is injected into the modulator waveguide through either port 1 of M3 or port 2 of M4 and the modulated signal is coupled out of the device. In the second path, probe light is frequency-shifted using an acousto-optic modulator to $\omega_{(p)}^{(2)} + \Delta$ to act as an optical local oscillator. This tone is combined with the) output light from the chip on a fast photodiode, where heterodyne spectral analysis is performed in the microwave domain using a radiofrequency spectrum analyzer.

Figure 3B:
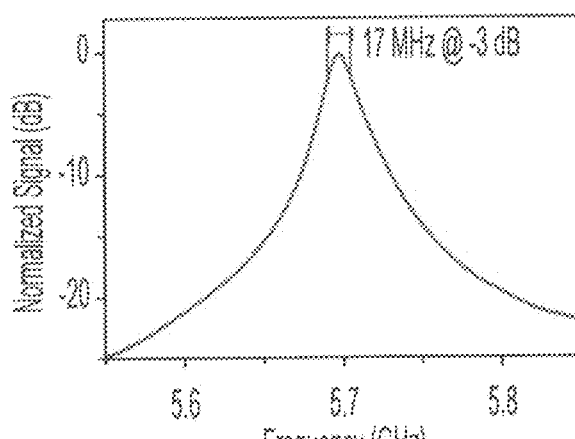
FIG. 3b depicts a graph of a phase-matched frequency response of modulation for Stokes-shifted light at frequency $\omega_P^{(2)}+\Delta$ as a function of pump-wave detuning $\Omega$. These data show strong Brillouin coupling through a resonant acoustic mode at frequency $\Omega_B/2\pi=5.7$ GHz.
Figure 3C:
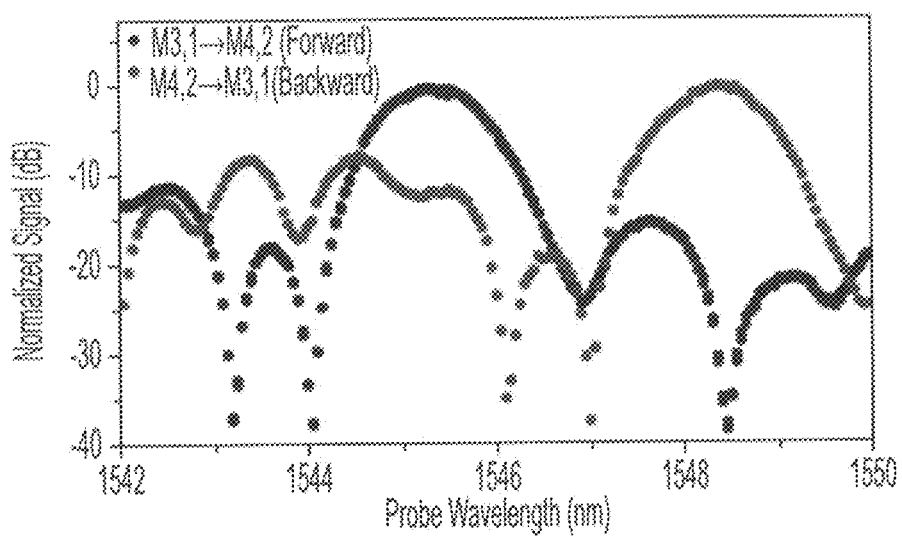
FIG. 3c illustrates experimental probe-wavelength dependence results of the Stokes scattering efficiency when the pump-wave detuning is set to $\Omega=\Omega_B$ for forward and backward-injected probe light in a single device.

The modulation response of the device is plotted in FIG. 3b-c. FIG. 3b shows the frequency response of the modulated signal amplitude as a function of drive frequency $\Omega$ when $\omega_{(p)}^{(2)}$ is set such that phase-matching is satisfied for backward-propagating light ($\Delta q = 0$, $\lambda_p^{(2)} = \lambda_b = 1548.5$ nm). These data reveal a resonant response around $\Omega/2\pi = \Omega_B/2\pi = 5.7$ GHz corresponding to coupling mediated by the acoustic phonon mode diagrammed in FIG. 1g. For the rest of the paper, this drive frequency, and hence modulation frequency, is fixed to this acoustic phonon resonance frequency, which ensures optimal modulation efficiency. FIG. 3c plots the normalized modulation efficiency at $Q = Q_B$ as a function of probe wavelength Ap for both forward and backward propagating light, showing a FWHM modulation bandwidth of about 1 nm (125 GHz) in both propagation directions. Maximum nonreciprocity is achieved between forward/backward propagation around a center wavelength of 1548.5 nm. In this configuration, significant modulation is achieved only in the backward direction. The deviation in these responses from the ideal sinc-squared response (FIG. 2i) is likely due to inhomogeneities in device fabrication (see section (I)(E)).

Figure 3D:
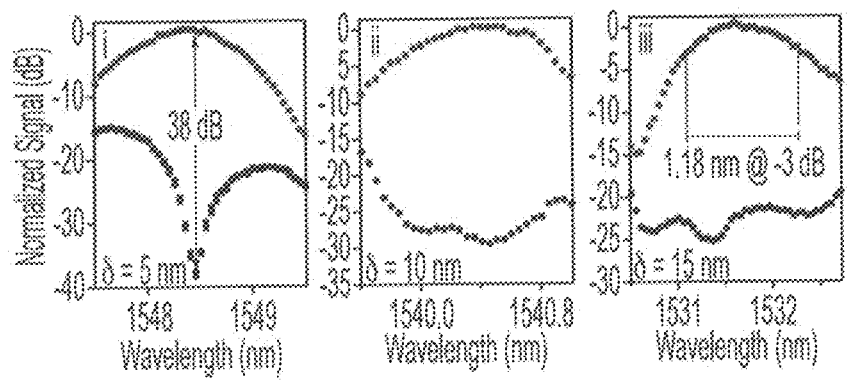
FIG. 3d depicts zoomed-in plots for three different devices showing forward/backward Stokes scattering efficiency around the wavelength of optimal backward phase-matching demonstrating nonreciprocal modulation and mode conversion. The data are for drive/modulator waveguide width asymmetries of (i) δ=5 nm, (ii) δ=10 nm, and (iii) δ=15 nm. Note that as the difference in waveguide widths is increases, the difference between pump and probe wavelengths must be increased to satisfy phase-matching.

Nonreciprocal modulation data for three different devices with the same acoustic resonance frequency are plotted in FIG. 3d.i-iii. These data correspond to devices with waveguide-width asymmetries of 6=5 nm, 10 nm, and 15 nm, respectively, with FIG. 3d.i representing the same device as studied in FIG. 4b-c. These data demonstrate a maximum nonreciprocity of 38 dB in FIG. 3d.i, and more than 19 dB of nonreciprocity over the entire FWHM bandwidth (1.18 nm, or 150 GHz) of the device in FIG. 3d.iii. Note that the center wavelength for maximum modulation is different for each device-this results from the variation in optical dispersion as device core size is changed. Using this principle, it should be possible to design modulator devices where optical drive and inter-band modulation wavelengths are very different (e.g. pump light at 1550 nm could be used to modulate a signal in the mid-infrared, or vice versa).

In addition to varying the center modulation wavelength through device design, the wavelength response of the NIBS modulator is also directly tunable by changing the pump wavelength, and consequentially, the incident phonon wavevector. This wavelength-agility is demonstrated in FIG. 3f Within the save device, the pump wavelength is tuned form 1530 nm to 1565 nm, translating the probe modulation response by a corresponding amount with negligible changes to the overall modulation response. Through this process, the 1 nm operation bandwidth may be continuously tuned over the entire c-band. This range was limited only by the source laser wavelength tunability (see section (IV)).

Figure 3E:
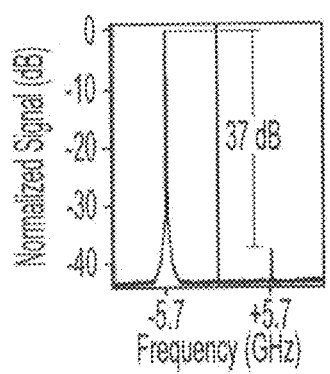
FIG. 3e plots Stokes/anti-Stokes asymmetry for scattered probe light when the modulator is driven on-resonance ($\Omega=\Omega_B$). A small amount of output light is blue-shifted through an anti-Stokes scattering process due to crosstalk in the integrated mode multiplexers.
Figure 3F:
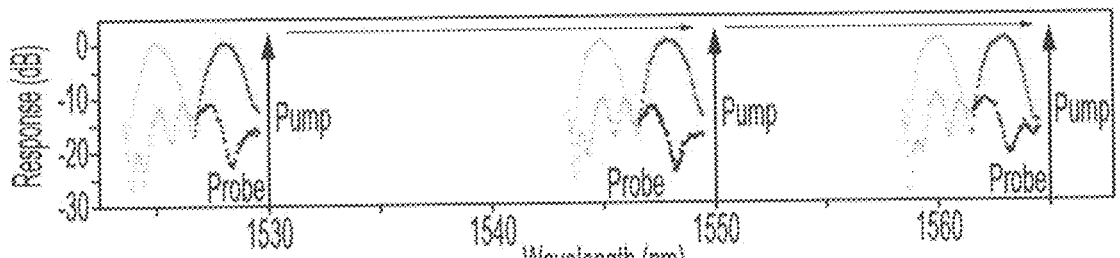
FIG. 3f plots tuning of the probe modulation response as a function of pump laser wavelength. As the pump is tuned from 1530 nm to 1565 nm, the probe response is translated in wavelength by a corresponding amount

The nonreciprocal NIBS modulator behaves as a single-sideband frequency shifter because Stokes and anti-Stokes processes are inherently decoupled in inter-modal Brillouin scattering. FIG. 3e plots the measured optical signal as a function of frequency relative to the incident probe wave. A Stokes/anti-Stokes asymmetry of 37 dB is demonstrated through this process. Throughout these experiments, the maximum modulation efficiency relative to the input probe power $\eta^2 \equiv P(M3, 1)/P(M4, 2)$ is around 1% (see section (VI)).

The results are now described.

Figure 1A:
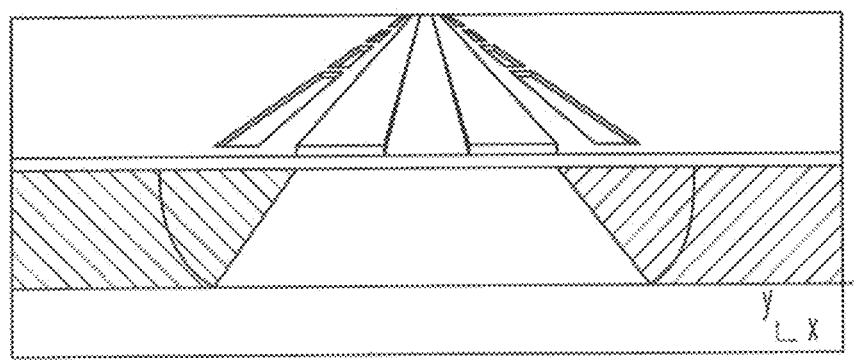
FIG. 1a depicts a representation of a silicon waveguide inter-band modulator. As shown, a membrane structure with two ridge waveguides is suspended by periodic nanoscale tethers.
Figure 1B:
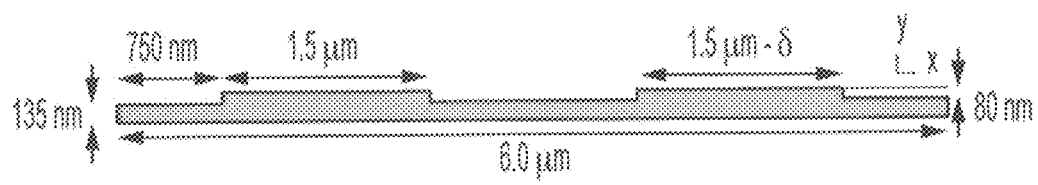
FIG. 1b depicts a diagram of the device cross-section and dimensions. A small asymmetry between waveguide widths is designed to prevent optical crosstalk between the two cores.
Figure 1C:
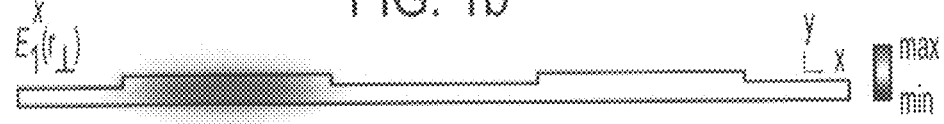
FIGS. 1c if plot the $E_x$ component of the fundamental and first excited optical modes of each waveguide, respectively.
Figure 1D:
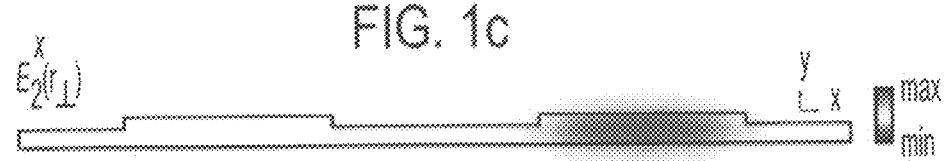
FIG. 1g plots the xdisplacement component of the ~5.7 GHz acoustic mode which mediates inter-modal Brillouin coupling in both ridge waveguides.
FIG. 1h diagrams the spatial character of the nonlocal inter-band Brillouin scattering process. Two optical waves guided in different spatial modes (dispersion bands) of a 'drive' waveguide transduce a monochromatic traveling-wave acoustic phonon at their difference frequency. This phonon frequency-shifts and mode-converts light guided in a spatially-separate 'modulator' waveguide.
FIG. 1i plots an energy level diagram for this nonlocal scattering process-note that the optical frequencies for drive and modulation processes need not be the same.
FIGS. 1j and 1k are diagrams depicting light propagation in both directions through the modulator waveguide. Forward-propagating light is mode-converted and frequency-shifted by the incident phonon as it traverses the device. By contrast, backward-propagating light propagates through the device unaffected.
Figure 1E:
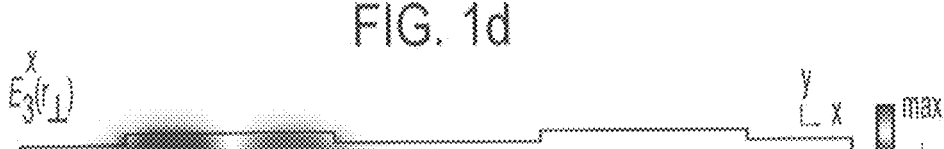
Figure 1F:
Figure 1G:
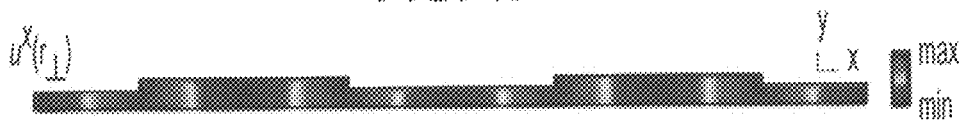

A nonreciprocal inter-band modulation utilizing the dual-core optomechanical waveguide is demonstrated and diagrammed in FIG. 1a-b. This structure consists of a suspended silicon membrane, which guides both light and sound waves. While light is confined to the cores of two distinct multi-mode ridge waveguides, guided optical waves may interact with elastic waves that extend throughout the membrane structure. Each waveguide guides a fundamental mode with a symmetric $E_x$-field profile (FIG. 1c-d) and a higher-order mode with an antisymmetric field profile (FIG. 1e-f) around a vacuum wavelength $\lambda_0 \sim 1550$ nm. One acoustic phonon mode which mediates nonlocal acousto-optic coupling around a frequency of $\Omega_B = 5.7$ GHz is plotted in FIG. 1g.

Figure 1H:
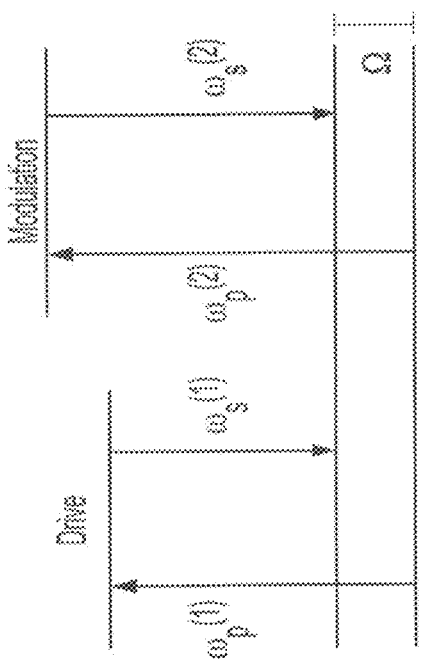
Figure 1I:
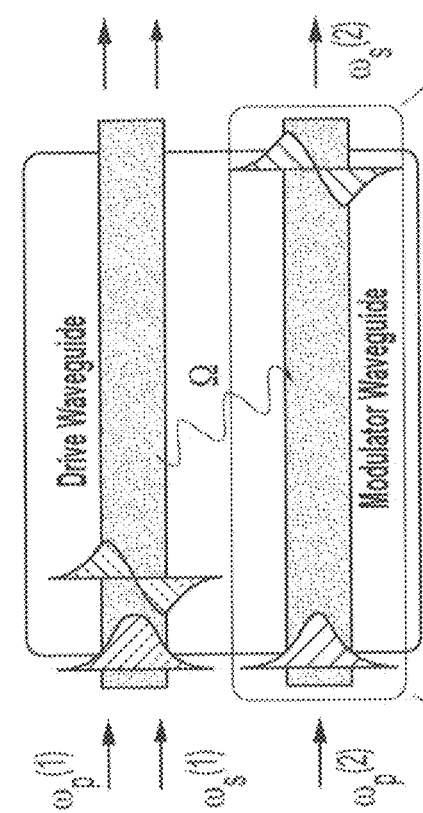
Figure 1J:
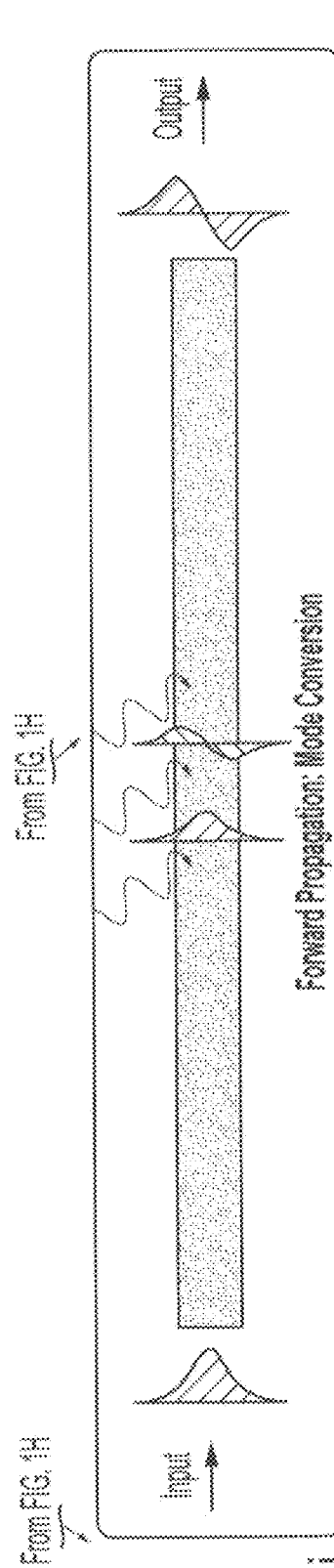

Inter-band modulation is realized in this structure through the process diagrammed in FIG. 1h. Pump waves at frequencies $\omega_{(p)}^{(1)}$ and $\omega_{(s)}^{(1)}$ are injected into distinct symmetric and anti-symmetric optical modes of one of the optical ridge waveguides (labeled 'drive' in FIG. 1h). These fields excite a monochromatic, traveling-wave acoustic phonon at difference frequency $\Omega = \omega_{(p)}^{(1)} - \omega_{(s)}^{(1)}$ through an inter-band Brillouin process called stimulated inter-modal Brillouin scattering (SIMS) [28]. A probe wave (frequency $\omega_{(p)}^{(2)}$) is injected into the symmetric optical mode of a distinct 'modulator' waveguide. The driven acoustic phonon spatiotemporally modulates probe light to produce mode conversion and a frequency shift to $\omega_s^{(2)} = \omega_p^{(2)} - \Omega$. This process can be understood as a nonlocal form of coherent Stokes Brillouin scattering (in direct analogy to coherent Stokes Raman scattering) with the energy level diagram plotted in FIG. 1i. A corresponding process of coherent anti-Stokes Brillouin scattering can also be produced (see section (V)). We collectively term these processes nonlocal inter-band Brillouin scattering (NIBS) to describe their salient spatial behavior and dynamics.

Figure 1K:
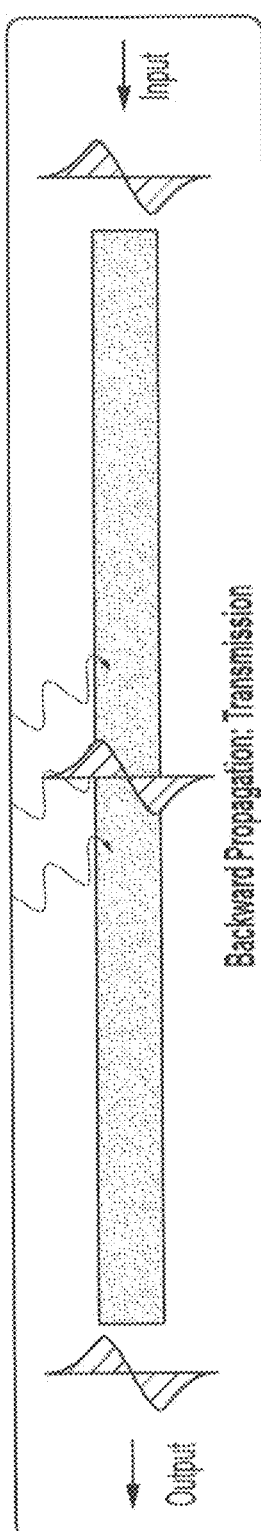

In the NIBS process, the travelling acoustic wave breaks the symmetry between forward- and backward-propagating optical waves, producing unidirectional mode conversion and single-sideband modulation. As diagrammed in FIG. 1j, as light injected in the forward direction of the modulator waveguide traverses the device, it is mode-converted and frequency-shifted through a linear acousto-optic modulation process. However, when light is injected into the same waveguide in the backward direction, it propagates through the waveguide unaffected (FIG. 1k).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

Equivalents

Although preferred embodiments of the invention have been described using specific terms, such description is for illustrative purposes only, and it is to be understood that changes and variations may be made without departing from the spirit or scope of the following claims.

Incorporation by Reference

The entire contents of all patents, published patent applications, and other references cited herein are hereby expressly incorporated herein in their entireties by reference.

The invention claimed is:

1. A device comprising:
   a structure configured to laterally confine travelling acoustic phonons (hypersound) throughout;
   a first multimode optical waveguide embedded within the structure;
   an acoustic phonon emitter within the structure;
   a first spatial-mode multiplexer in communication with a first end of the first multimode optical waveguide; and
   a second spatial-mode multiplexer in communication with a second end of the first multimode optical waveguide;
   wherein the first multimode optical waveguide is selected to couple to the acoustic phonons (hypersound) confined within the structure.

2. The device of claim 1, wherein the acoustic phonon emitter is a piezoelectric or electromechanical device.

3. The device of claim 1, wherein the structure configured to laterally confine travelling acoustic phonons (hypersound) throughout is a trench adjacent to the first multimode optical waveguide and the acoustic phonon emitter.

4. The device of claim 1, wherein:
   the acoustic phonon emitter is a second multimode optical waveguide; and
   the first multimode optical waveguide and the second multimode optical waveguide are optically isolated from each other as a result of different widths.

5. The device of claim 4, wherein the first multimode optical waveguide and the second multimode optical waveguide are optically isolated from each other as a result of a sufficient lateral distance between the first multimode optical waveguide and the second multimode optical waveguide.

6. The device of claim 5, wherein the sufficient lateral distance is at least a width of the first multimode optical waveguide.

7. The device of claim 4, wherein the first multimode optical waveguide and the second multimode optical waveguide are optically isolated from each other as a result of additional optical features between the first multimode optical waveguide and the second multimode optical waveguide.

8. The device of claim 4, wherein the first multimode optical waveguide and the second multimode optical waveguide are parallel.

9. A system comprising:
   the device of according to claim 1;
   a first light source optically coupled to the first end of the first multimode optical waveguide via the first multiplexer, the first light source emitting a probe wave having a frequency $\omega_p^{(2)}$; and
   a driver configured to drive the acoustic phonon emitter to emit acoustic phonons (hypersound).

10. The system of claim 9, wherein the acoustic phonons (hypersound) are induced through stimulated inter-modal Brillouin scattering (SIMS).

11. A system comprising:
a device comprising:
- a structure configured to laterally confine travelling acoustic phonons (hypersound) throughout;
- a first multimode optical waveguide embedded within the structure; and
- an acoustic phonon emitter within the structure;
wherein:
- the first multimode optical waveguide is selected to couple to the acoustic phonons (hypersound) confined within the structure;
- the acoustic phonon emitter is a second multimode optical waveguide; and
- the first multimode optical waveguide and the second multimode optical waveguide are optically isolated from each other as a result of different widths;
a first light source optically coupled to a proximal end of the first multimode optical the first light source emitting a probe wave having a frequency $\omega_p^{(2)}$;
a driver configured to drive the acoustic phonon emitter to emit acoustic phonons (hypersound);
a second light source optically coupled to a proximal end of the second optical waveguide, the first light source emitting a pump wave having a frequency $\omega_p^{(1)}$;
a third light source optically coupled to the proximal end of the second optical waveguide, the second light source emitting a signal wave having a frequency $\omega_s^{(1)}$;
wherein the third light source is coupled into a different optical mode or polarization from the second light source.

12. The system of claim 11, wherein the pump wave and the signal wave induce the acoustic phonon around a difference frequency $\Omega=\omega_p^{(2)}-\omega_s^{(2)}$.

13. The system of claim 11, wherein the acoustic phonon produces mode conversion and a frequency shift to $\omega_s^{(1)}=\omega_p^{(1)}-\Omega$ or $\omega_{as}^{(1)}=\omega_p^{(1)}+\Omega$.

14. The system of claim 13, wherein the mode conversion is unidirectional.

15. A device comprising:
- a structure configured to laterally confine travelling acoustic phonons (hypersound) throughout;
- a first multimode optical waveguide embedded within the structure; and
- an acoustic phonon emitter within the structure;
wherein:
- the first multimode optical waveguide is selected to couple to the acoustic phonons (hypersound) confined within the structure;
- the acoustic phonon emitter is a second multimode optical waveguide; and
- the first multimode optical waveguide and the second multimode optical waveguide are optically isolated from each other as a result of different widths.

16. The device of claim 15, wherein the first multimode optical waveguide and the second multimode optical waveguide are optically isolated from each other as a result of a sufficient lateral distance between the first multimode optical waveguide and the second multimode optical waveguide.

17. The device of claim 16, wherein the sufficient lateral distance is at least a width of the first multimode optical waveguide.

18. The device of claim 15, wherein the first multimode optical waveguide and the second multimode optical waveguide are optically isolated from each other as a result of additional optical features between the first multimode optical waveguide and the second multimode optical waveguide.

19. The device of claim 15, wherein the first multimode optical waveguide and the second multimode optical waveguide are parallel.

* * * * *